United States Patent
Ayyadurai et al.

(10) Patent No.: US 12,458,623 B2
(45) Date of Patent: Nov. 4, 2025

(54) LOW-GRADE INFLAMMATION COMPOSITIONS

(71) Applicant: CytoSolve, Inc., Cambridge, MA (US)

(72) Inventors: V. A. Shiva Ayyadurai, Cambridge, MA (US); Prabhakar Deonikar, Cambridge, MA (US)

(73) Assignee: CytoSolve, Inc., Cambridge, MA (US)

( * ) Notice: Subject to any disclaimer, the term of this patent is extended or adjusted under 35 U.S.C. 154(b) by 0 days.

(21) Appl. No.: 18/123,128

(22) Filed: Mar. 17, 2023

(65) Prior Publication Data

US 2023/0293484 A1    Sep. 21, 2023

Related U.S. Application Data

(60) Provisional application No. 63/321,544, filed on Mar. 18, 2022.

(51) Int. Cl.

| | | |
|---|---|---|
| *A61K 31/353* | (2006.01) | |
| *A61K 9/00* | (2006.01) | |
| *A61K 31/01* | (2006.01) | |
| *A61K 31/07* | (2006.01) | |
| *A61K 31/355* | (2006.01) | |
| *A61K 31/375* | (2006.01) | |
| *A61P 29/00* | (2006.01) | |

(52) U.S. Cl.
CPC .......... *A61K 31/353* (2013.01); *A61K 9/0053* (2013.01); *A61K 31/01* (2013.01); *A61K 31/07* (2013.01); *A61K 31/355* (2013.01); *A61K 31/375* (2013.01); *A61P 29/00* (2018.01)

(58) Field of Classification Search
CPC ..... A61K 31/353; A61K 9/0053; A61K 31/01
See application file for complete search history.

(56) References Cited

U.S. PATENT DOCUMENTS

2016/0120890 A1* 5/2016 Singh .................... A61K 31/095
                                                                    514/35
2020/0230386 A1* 7/2020 Montrose .............. A61M 35/10

FOREIGN PATENT DOCUMENTS

WO    WO-2017161387 A1 *   9/2017   ............. A61K 31/12

OTHER PUBLICATIONS

WO 2017161387 Machine translation (Year: 2017).*

* cited by examiner

*Primary Examiner* — Sarah Pihonak
*Assistant Examiner* — Mikhail O'Donnel Robinson
(74) *Attorney, Agent, or Firm* — Oblon, McClelland, Maier & Neustadt, L.L.P.

(57) ABSTRACT

The present disclosure is related to dietary supplements. For example, this disclosure relates to compositions that include, one or more agents that decrease the production of tumor necrosis factor-alpha (TNF-α), decrease the CCL2, and decrease the interleukin-1 beta (IL-1β) responsible for low grade chronic inflammation.

In some embodiments, the composition comprises: epicatechin present in an amount of about 0.25% to about 1% w/w of the composition; EGCG present in an amount of about 0.01% to about 0.1% w/w of the composition; lycopene present in an amount of about 1% to about 3% w/w of the composition; quercetin present in an amount of about 0.1% to about 1% w/w of the composition; luteolin present in an amount of about 0.1% to about 1% w/w of the composition; vitamin A present in an amount of about 1% to about 7.5% w/w of the composition; vitamin C present in an amount of about 40% to about 77% w/w of the composition; and vitamin E present in an amount of about 15% to about 40% w/w of the composition. Such compositions are useful for improving LGCI by decreasing TNF-α, CCL2, and IL-1β concentration.

4 Claims, 15 Drawing Sheets

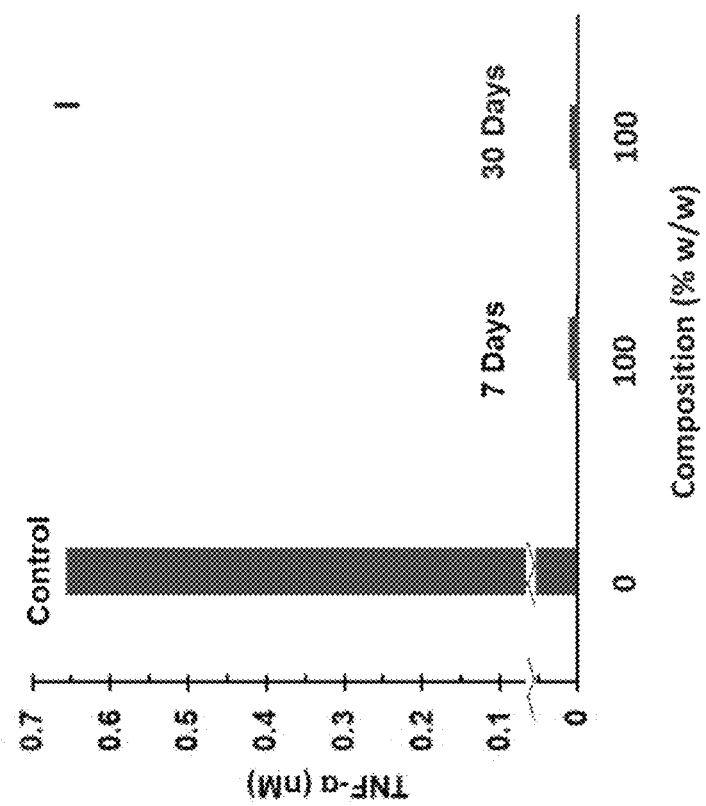

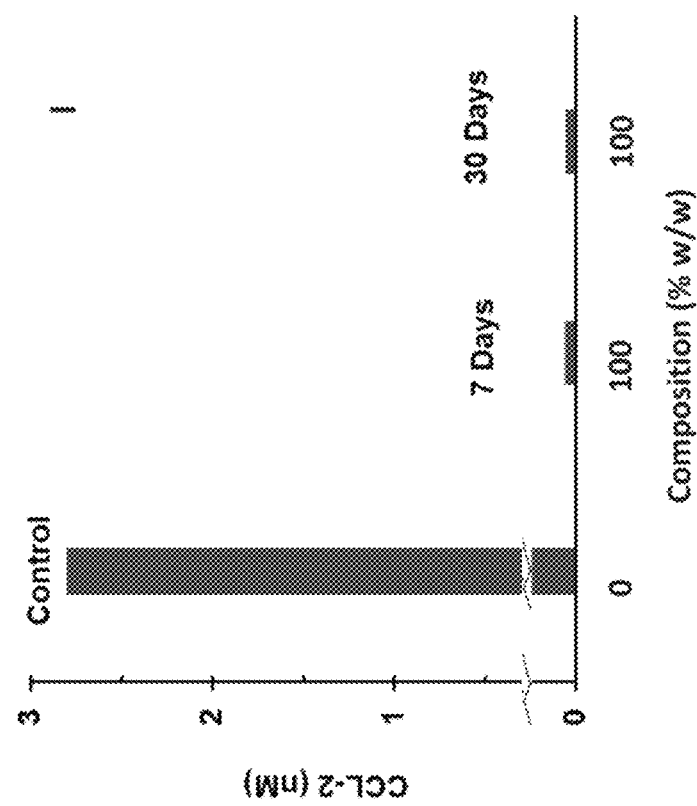

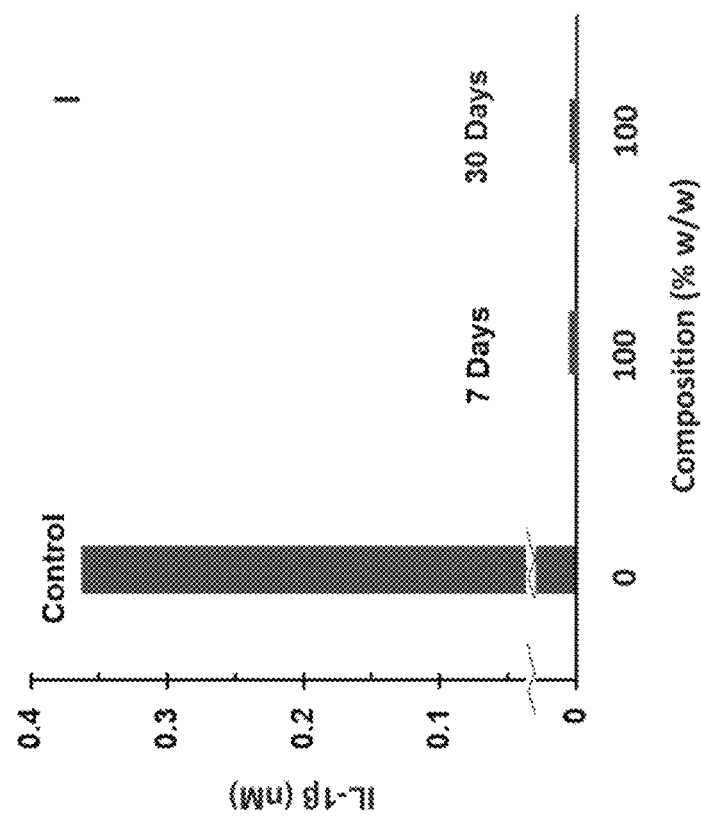

LOW-GRADE INFLAMMATION COMPOSITIONS

This application claims benefit of the filing date of U.S. application 63/321,544, filed Mar. 18, 2022, and incorporates the entire contents of the application herein.

TECHNICAL FIELD

This disclosure is related to the field of dietary supplements. For example, this disclosure relates to compositions useful for low-grade inflammation effects. Such compositions can include, for example, one or more agents that lower the production of tumor necrosis factor-alpha, CC motif chemokine ligand 2, and interleukin-1 beta.

BACKGROUND

Low-grade chronic inflammation (LGCI) is defined by the persistent presence of elevated levels of circulating cytokines such as interleukin-6 (IL-6), tumor necrosis factor-alpha (TNFα), and interleukin-1 beta (IL-1β) that promote disease progression. LGCI is a strong and independent risk factor for many chronic diseases, like cardiovascular, musculoskeletal, metabolic, and neurological conditions.

Short periods of intense exercise create an inflammatory environment that promotes LGCI in athletes and sportspersons, leading to a higher risk of atherosclerosis and related adverse cardiac events with age. A recent study reported prevalence of atherosclerotic plaques in 44% middle- to old-aged endurance athletes compared to the 22% sedentary controls. Use of anti-inflammatory supplements and diets to mitigate LGCI is increasing among the endurance athletes.

LGCI drives the pathogenesis of osteoarthritis by accelerating catabolic responses in chondrocytes, inflammation of the synovial membrane, and promoting pain in the joint. Inflammatory mediators including pro-inflammatory cytokines, complement proteins, toll-like receptors, etc. are also implicated in pathogenesis of several age-related neurodegenerative diseases such as dementia and Alzheimer's disease. In addition, LGCI in metabolically active tissues such as liver, pancreas, and adipose tissue leads to metabolic disorders such as obesity, insulin resistance and consequently diabetes mellitus, and fatty liver disease.

Diet is a significant contributing factor that modulates systemic LGCI. Various components of the diet including dietary fats, dietary carbohydrates, and micronutrients modulate LGCI. Saturated fatty acids from dietary fats have been shown to promote pro-inflammatory cytokines induced metabolic stress that leads to pathologies such as type II diabetes mellitus and obesity. On the other hand, polyunsaturated omega 3 fatty acid derived metabolites have been shown to counteract pro-inflammatory state. Glycemic load from dietary carbohydrates plays a significant role in the pathogenesis of type II diabetes mellitus and cardiovascular disease via LGCI and oxidative stress. Diet consisting of high fiber content has been shown to effectively reduce pro-inflammatory biomarkers whereas diet with low fiber content led to a pro-inflammatory environment.

Plant-derived micronutrients have been ascribed antioxidant and anti-inflammatory properties and have been reported to modulate pro-inflammatory cytokines such as TNF-α and C reactive protein (CRP). Methods and compositions that include the exogenous anti-inflammatory molecules for lowering LGCI are highly desirable.

SUMMARY

Provided herein are methods for improving LGCI in a subject in need thereof comprising administering to the subject a composition comprising two or more agents that decrease TNF-α concentrations, decrease CC motif chemokine ligand 2 (CCL2) concentrations, and decrease IL-1β concentrations.

In some embodiments, LGCI is associated with one or more of: cellular toxicity, infection, cancer, cardiovascular diseases such as atherosclerosis, neurodegenerative diseases such as Parkinson's disease, Alzheimer's disease, amyotrophic lateral sclerosis (ALS), multiple sclerosis, depression, memory loss, obesity, osteoarthritis, stress, diabetes mellitus, or aging.

In some embodiments, at least one agent that decrease TNF-α concentrations; also decreases CCL2 concentrations and decreases IL-1β concentrations or a combination thereof.

In some embodiments, at least one agent that decreases the concentration of TNF-α modulates TNF-α production pathway. In some embodiments, at least one agent that decreases the concentration of CCL2 modulates CCL2 production pathway. In some embodiments, at least one agent that decreases the concentration of IL-1β modulates IL-1β production pathway.

In some embodiments, the two or more agents that decrease of TNF-α concentration, decrease TNF-α concentration, decrease IL-1β concentration, comprise one or more of: a flavonol; a carotene; a flavone; a retinoic acid; a carboxylic acid; and, a benzopyran.

Also provided herein are methods for improving LGCI in a subject in need thereof comprising administering to the subject a composition comprising two or more agents that decrease TNF-α concentrations; decrease CCL2 concentrations; decrease IL-1β concentrations; or a combination thereof.

In some embodiments, LGCI is associated with one or more of: cellular toxicity, infection, cancer, cardiovascular diseases such as atherosclerosis, neurodegenerative diseases such as Parkinson's disease, Alzheimer's disease, amyotrophic lateral sclerosis (ALS), multiple sclerosis, depression, and memory loss, obesity, stress, osteoarthritis, diabetes mellitus, or aging.

In some of any of the above embodiments, the wherein the flavonol is a flavan 3-ols. In some embodiments, the flavan 3-ols is selected from the group consisting of: epicatechin; procyanidin C1; procyanidin B2; cinnamtannin A2, and, a combination thereof.

In some embodiments, the flavonol is epicatechin.

In some embodiments, the flavonol is present in an amount of about 0.001% to about 5% w/w of the composition. In some embodiments, the flavonol is present in an amount of about 0.1% to about 3% w/w of the composition. In some embodiments, the flavonol is present in an amount of about 0.25% to about 1% w/w of the composition. In some embodiments, the flavonol is present in an amount of about 0.7% w/w of the composition.

In some of any of the above embodiments, the wherein the flavonol is a flavan. In some embodiments, the flavan is selected from the group consisting of: epigallocatechin 3-gallate (EGCG); theaflavin 3,3'-digallate; (S)-2-hydroxynaringenin; prunin 6"-O-gallate; and, a combination thereof.

In some embodiments, the flavonol is EGCG.

In some embodiments, the flavonol is present in an amount of about 0.001% to about 5% w/w of the composition. In some embodiments, the flavonol is present in an amount of about 0.005% to about 1% w/w of the composition. In some embodiments, the flavonol is present in an amount of about 0.01% to about 0.1% w/w of the composition. In some embodiments, the flavonol is present in an amount of about 0.04% w/w of the composition.

In some of any of the above embodiments, the wherein the carotene is an acyclic carotene. In some embodiments, the acyclic carotene is selected from the group consisting of: proneurosporene, lycopersene, lycopene, phytoene, and a combination thereof.

In some embodiments, the carotene is lycopene.

In some embodiments, the carotene is present in an amount of about 0.01% to about 30% w/w of the composition. In some embodiments, the carotene is present in an amount of about 0.05% to about 15% w/w of the composition. In some embodiments, the carotene is present in an amount of about 1% to about 3% w/w of the composition. In some embodiments, the carotene is present in an amount of about 1.6% w/w of the composition.

In some of any of the above embodiments, the wherein the flavone is a pentahydroxyflavone. In some embodiments, the pentahydroxyflavone is selected from the group consisting of: macaranone A; quercetin; broussonol E; cannabiscitrin; tricetin; and, a combination thereof.

In some embodiments, the flavone is quercetin.

In some embodiments, the flavone is present in an amount of about 0.001% to about 15% w/w of the composition. In some embodiments, the flavone is present in an amount of about 0.05% to about 5% w/w of the composition. In some embodiments, the flavone is present in an amount of about 0.1% to about 1% w/w of the composition. In some embodiments, the flavone is present in an amount of about 0.6% w/w of the composition.

In some of any of the above embodiments, the wherein the flavone is a tetrahydroxyflavone. In some embodiments, the tetrahydroxyflavone is selected from the group consisting of: maysin; luteolin; nigrasin I; macaranone B; and, a combination thereof.

In some embodiments, the flavone is luteolin.

In some embodiments, the flavone is present in an amount of about 0.01% to about 50% w/w of the composition. In some embodiments, the flavone is present in an amount of about 0.05% to about 10% w/w of the composition. In some embodiments, the flavone is present in an amount of about 0.1% to about 1% w/w of the composition. In some embodiments, the flavone is present in an amount of about 0.4% w/w of the composition.

In some of any of the above embodiments, the retinoic acid is an all-trans-retinol. In some embodiments, the retinoic acid is selected from the group consisting of: vitamin A; 13,14-dihydroretinoic acid, and a combination thereof.

In some embodiments, the retinoic acid is vitamin A.

In some embodiments, the retinoic acid is present in an amount of about 0.01% to about 300% w/w of the composition. In some embodiments, the retinoic acid is present in an amount of about 0.5% to about 15% w/w of the composition. In some embodiments, the retinoic acid is present in an amount of about 1% to about 7.5% w/w of the composition. In some embodiments, the retinoic acid is present in an amount of about 4.3% w/w of the composition.

In some of any of the above embodiments, the carboxylic acid is a ketoaldonic acid. In some embodiments, the carboxylic acid is selected from the group consisting of: D- or L-ascorbic acid (vitamin C); erythorbic acid; gulonic acid; and, a combination thereof.

In some embodiments, the carboxylic acid is vitamin C.

In some embodiments, the carboxylic acid is present in an amount of about 1% to about 99% w/w of the composition. In some embodiments, the carboxylic acid is present in an amount of about 10% to about 80% w/w of the composition. In some embodiments, the carboxylic acid is present in an amount of about 40% to about 77% w/w of the composition. In some embodiments, the carboxylic acid is present in an amount of about 61.7% w/w of the composition.

In some of any of the above embodiments, the benzopyran is a tocopherol. In some embodiments, the tocopherol is selected from the group consisting of: vitamin E (α-tocopherol); β-tocopherol; 3,4-Dehydro-gamma-tocopherol; δ-tocopherol; and, a combination thereof.

In some embodiments, the benzopyran is vitamin E.

In some embodiments, the benzopyran is present in an amount of about 1% to about 90% w/w of the composition. In some embodiments, the benzopyran is present in an amount of about 5% to about 60% w/w of the composition. In some embodiments, the benzopyran is present in an amount of about 15% to about 40% w/w of the composition. In some embodiments, the benzopyran is present in an amount of about 26.82% w/w of the composition.

In some embodiments, the flavonol is epicatechin and/or EGCG, the flavone is quercetin and/or luteolin; the carotene is lycopene; the retinoic acid is vitamin A; the carboxylic acid is vitamin C; and, the benzopyran is vitamin E.

In some embodiments, the composition comprises two or more of: epicatechin; EGCG; quercetin; luteolin; lycopene; vitamin A; vitamin C; and, vitamin E. In some embodiments, the composition comprises three or more of: epicatechin; EGCG; quercetin; luteolin; lycopene; vitamin A; vitamin C; and, vitamin E. In some embodiments, the composition comprises four or more of: epicatechin: EGCG; quercetin; luteolin; lycopene; vitamin A; vitamin C; and, vitamin E. In some embodiments, the composition comprises five or more of: epicatechin; EGCG; quercetin; luteolin; lycopene; vitamin A; vitamin C; and, vitamin E. In some embodiments, the composition comprises six or more of: epicatechin; EGCG; quercetin; luteolin; lycopene; vitamin A; vitamin C; and, vitamin E. In some embodiments, the composition comprises seven or more of: epicatechin: EGCG; quercetin; luteolin; lycopene; vitamin A; vitamin C; and, vitamin E.

In some embodiments, the composition comprises: epicatechin present in an amount of about 0.25% to about 1% w/w of the composition; EGCG present in an amount of about 0.01% to about 0.1% w/w of the composition; lycopene present in an amount of about 1% to about 3% w/w of the composition; quercetin present in an amount of about 0.1% to about 1% w/w of the composition; luteolin present in an amount of about 0.1% to about 1% w/w of the composition; vitamin A present in an amount of about 1% to about 7.5% w/w of the composition; vitamin C present in an amount of about 40% to about 77% w/w of the composition; and vitamin E present in an amount of about 15% to about 40% w/w of the composition.

In some embodiments, the composition comprises: epicatechin present in an amount of about 0.7% w/w of the composition; EGCG present in an amount of about 0.04% w/w of the composition; lycopene present in an amount of about 1.6% w/w of the composition; quercetin present in an amount of about 0.6% w/w of the composition; luteolin present in an amount of about 0.4% w/w of the composition; vitamin A present in an amount of about 4.3% w/w of the composition; vitamin C present in an amount of about 61.7% w/w of the composition; and vitamin E present in an amount of about 26.82% w/w of the composition.

In some embodiments, the composition further comprises one or more excipients, diluents, or carriers.

In some embodiments, the composition is administered orally.

In some embodiments, the composition is configured as a powder.

Also provided herein is a method for decreasing TNF-α concentrations, CCL2 concentrations, and/or IL-1β concentrations of a subject comprising administering to the subject a composition as described herein.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
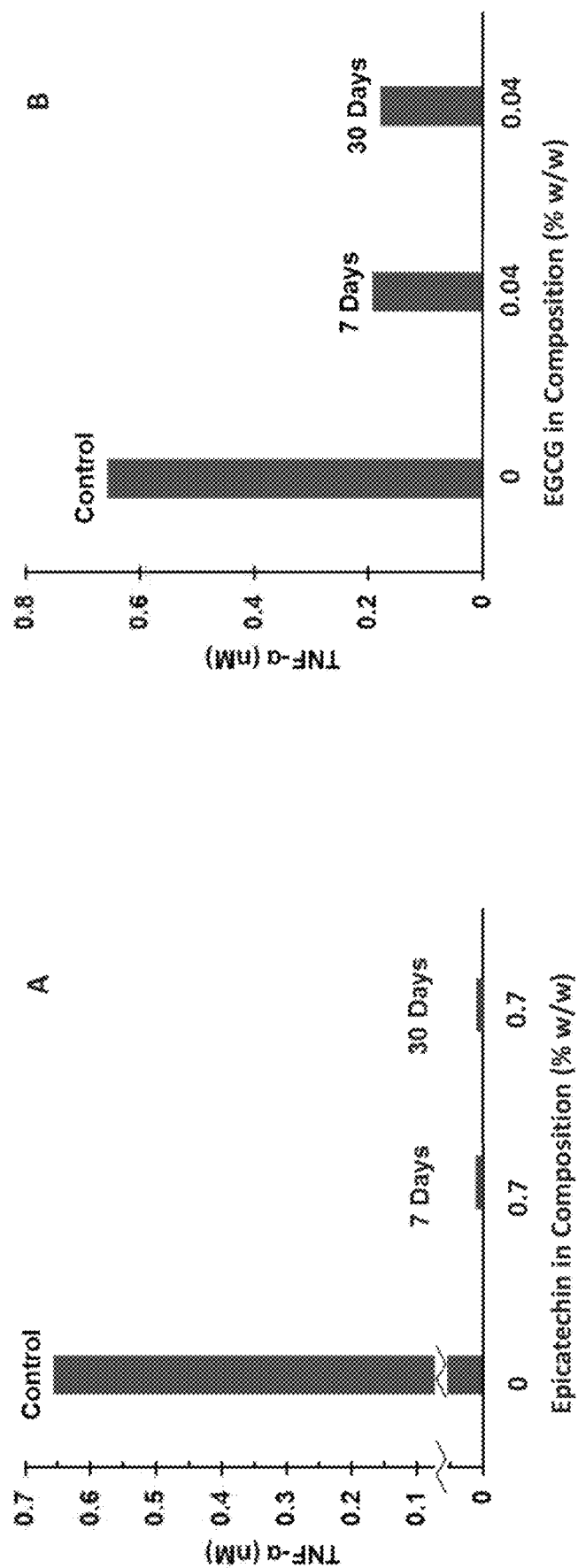
FIG. 1 shows bar graphs comparing the steady state concentrations of TNF-α for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the TNF-α levels are 0.65 nM, whereas for in individuals experiencing LGCI, the TNF-α levels fell to 0.0032 nM, 0.17 nM, 0.0033 nM, 0.19 nM, 0.16 nM, 0.003 nM, 0.014 nM, and 0.002 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the TNF-α fell to $9.56 \times 10^{-10}$ nM.
Figure 1:
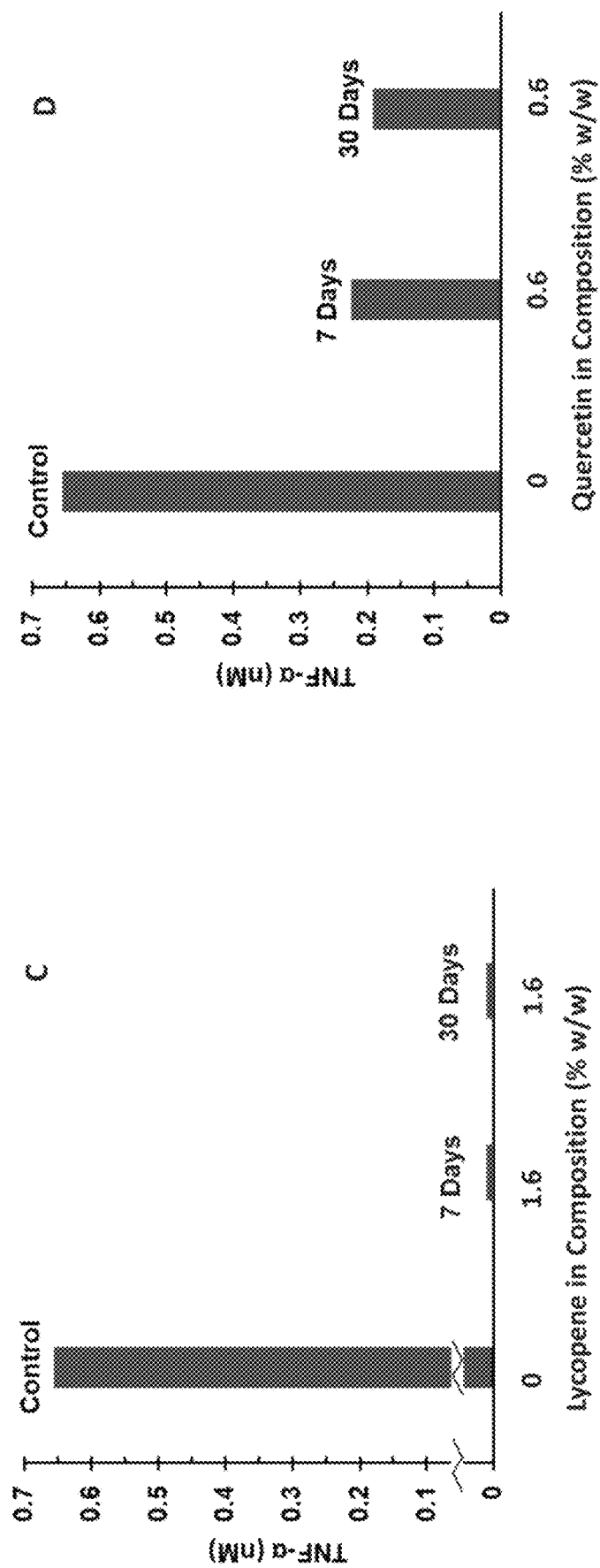
Figure 1:
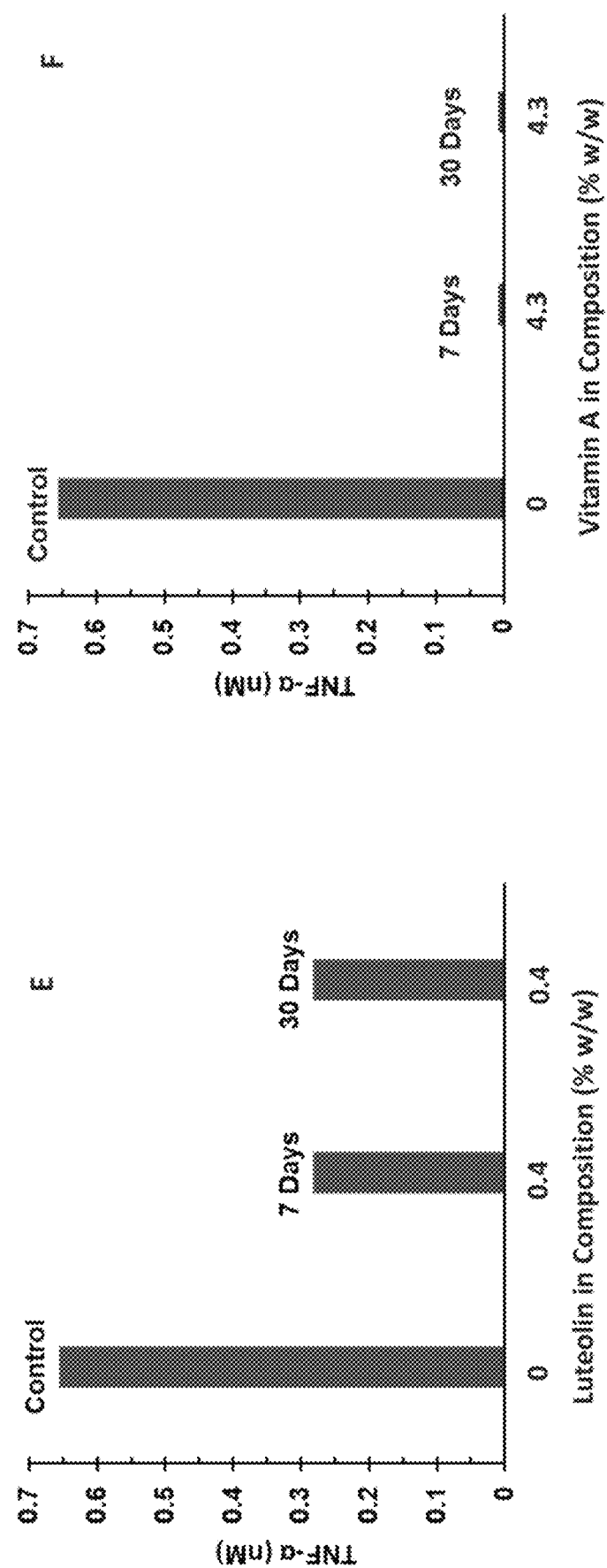
Figure 1:
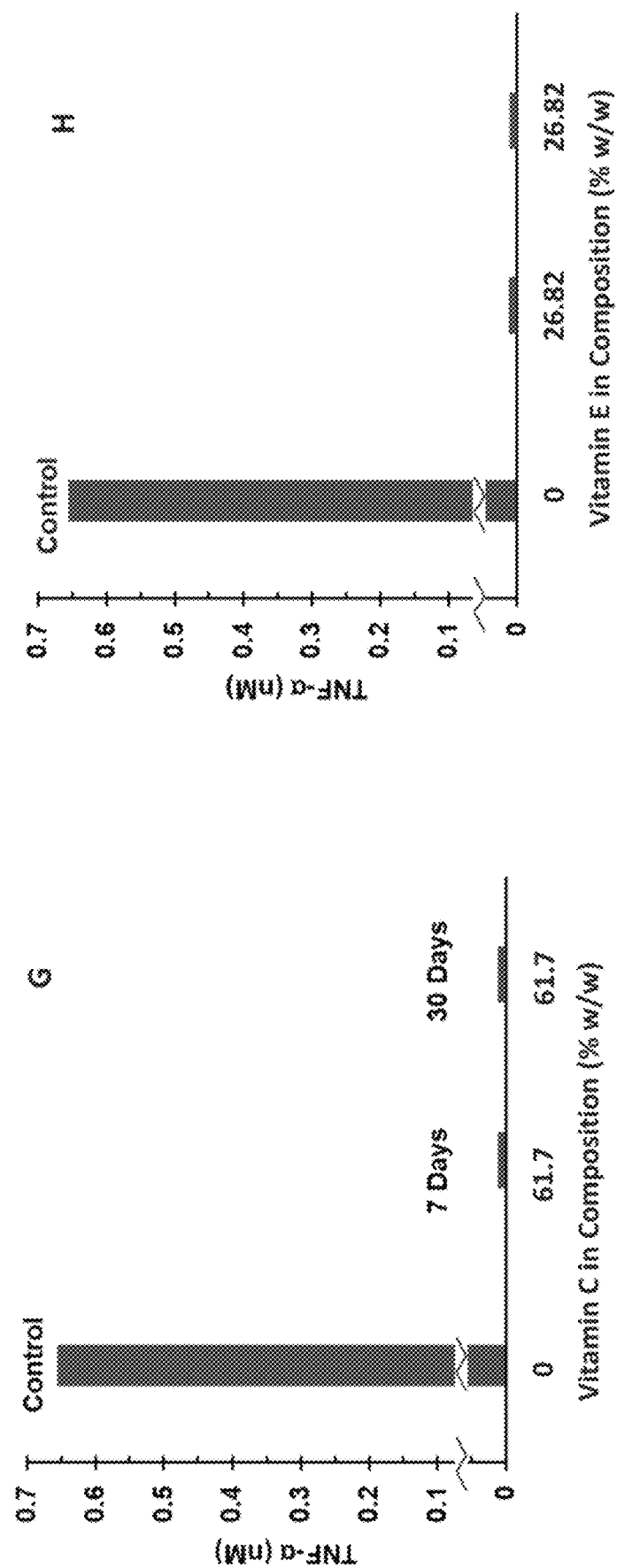

Low-grade chronic inflammation (LGCI) is defined by the persistent presence of elevated levels of circulating pro-inflammatory cytokines such as IL-6, TNF-α, and IL-1β that promote disease progression. These pro-inflammatory cytokines drive the pathogenesis of osteoarthritis by accelerating catabolic responses in chondrocytes, inflammation of the synovial membrane, and promoting pain in the joint. Additionally, they are also implicated in pathogenesis of several age-related neurodegenerative diseases such as dementia and Alzheimer's disease. LGCI in metabolically active tissues such as liver, pancreas, and adipose tissue leads to metabolic disorders such as obesity, insulin resistance and consequently diabetes mellitus, and fatty liver disease.

Diet is a significant contributing factor that modulates systemic LGCI. Various compounds of the diet including dietary fats, dietary carbohydrates, and micronutrients affect LGCI. Saturated fatty acids from dietary fats have been shown to promote pro-inflammatory cytokine-induced metabolic stress that leads to pathologies such as type II diabetes mellitus and obesity. On the other hand, polyunsaturated omega 3 fatty acid derived metabolites have been shown to counteract the pro-inflammatory state. Glycemic load from dietary carbohydrates plays a significant role in the pathogenesis of type II diabetes mellitus and cardiovascular disease via LGCI and oxidative stress. Diet consisting of high fiber content has been shown to effectively reduce pro-inflammatory biomarkers whereas diet with low fiber content led to a pro-inflammatory environment. Compositions, as described herein, mitigate LGCI via decreasing the production of LGCI biomarkers such as TNF-α, CCL2 and IL-1β.

Accordingly, the present disclosure provides methods and compositions (e.g., dietary supplements) related to decrease LGCI. Such compositions can contain two or more agents that reduce the production of CCL2, production of TNF-α, and production of IL-1β, or a combination thereof, useful for improvement in reduction in LGCI.

Definitions

As used herein, the phrase "LGCI," or "low production of TNF-α," or "low production of CCL2," or "low production of IL-1β," or a disease, disorder, or condition encompasses a subject with high production of TNF-α, CCL2, and/or IL-1β that has also been diagnosed with, was previously diagnosed with, or has symptoms associated with the disease, disorder, or condition.

As used herein, the phrases an "effective amount" or a "therapeutically effective amount" of an active agent or ingredient, or pharmaceutically active agent or ingredient, refer to an amount of the active agent sufficient enough to reduce or eliminate one or more symptoms of the disorder or to effect a cure upon administration. Effective amounts of the active agent will vary with the kind of active agent chosen, the particular condition or conditions being treated, the severity of the condition, the duration of the treatment, the specific components of the composition being used, and like factors.

As used herein, "subject" refers to any subject, particularly a mammalian subject, for whom diagnosis, prognosis, or therapy is desired, for example, a human.

Reference to the term "about" has its usual meaning in the context of compositions to allow for reasonable variations in amounts that can achieve the same effect and also refers herein to a value of plus or minus 10% of the provided value. For example, "about 20" means or includes amounts from 18 to and including 22.

As used herein, a "treatment" or "treating" of a disease, disorder, or condition encompasses alleviation of at least one symptom thereof, a reduction in the severity thereof, or the delay or inhibition of the progression thereof. Treatment need not mean that the disease, disorder, or condition is totally cured. A useful composition herein needs only to reduce the severity of a disease, disorder, or condition, reduce the severity of one or more symptoms associated therewith, or provide improvement to a patient or subject's quality of life.

Unless otherwise defined, all technical and scientific terms used herein have the same meaning as commonly understood by one of ordinary skill in the art to which this invention belongs. In case of conflict, the present specification, including definitions, will control. Throughout this specification and claims, the word "comprise," or variations such as "comprises" or "comprising" will be understood to imply the inclusion of a stated integer or group of integers but not the exclusion of any other integer or group of integers. Unless otherwise required by context, singular terms shall include pluralities and plural terms shall include the singular. As used herein, the singular form "a", "an", and "the" include plural references unless indicated otherwise. For example, "an" excipient includes one or more excipients. It is understood that aspects and variations of the invention described herein include "consisting of" and/or "consisting essentially of" aspects and variations. Methods and materials are described herein for use in the present invention; other, suitable methods and materials known in the art can also be used. The materials, methods, and examples are illustrative only and not intended to be limiting. All publications, patent applications, patents, sequences, databases entries, and other references mentioned herein are incorporated by reference in their entirety.

Agents that Decrease LGCI

In some embodiments, a composition as described herein can comprise an agent that decreases oxidative stress. For example, in some embodiments, an agent that decreases oxidative stress is an agent that decrease the production of TNF-α, CCL2, and/or IL-1β. As another example, an agent that decreases LGCI can be an agent that decreases production of TNF-α, CCL2, and/or IL-1β. Many agents that decrease the production of TNF-α, CCL2, and/or IL-1β are known to one of skill in the art. Non-limiting examples of an agent that decreases the production of TNF-α, CCL2, and/or IL-1β include epicatechin, EGCG, lycopene, quercetin, luteolin, vitamin A, vitamin C, and vitamin E. Several methods for measuring TNF-α, CCL2, and/or IL-1β are known to one of ordinary skill in the art. Non-limiting examples of such methods include: measuring TNF-α concentration using absorbance spectroscopy (see, for example, Hogan et al., *Current protocols in immunology*, J. Wiley & Sons, 1991, which is incorporated herein in its entirety) measuring CCL2 using ELISA (see, for example, Ritter et al., 2017, *Arq Bras Cardiol.* 2017; 108(4): 331-338, which is incorporated herein in its entirety); and measuring IL-1β using ELISA (see, for example, Yang and He, 2022, *BMC Complement Med Ther.* 2022 Mar. 3:22(1):55, which is incorporated herein in its entirety).

In some embodiments, an agent that decrease the production of TNF-α, CCL2, and/or IL-1β by at least 0.5%, 1%, 5%, 10%, or 15%. For example, the agent that decreases the production of production of TNF-α, CCL2, and/or IL-1β decreases the concentration of TNF-α, CCL2, and/or IL-1β by about 1%, about 2%, about 3%, about 4%, about 5%, about 10%, about 15% or more.

Flavonol

In some embodiments, a composition as described herein includes a flavonol that reduces production of TNF-α. In some embodiments, a composition as described herein includes a flavonol that reduces production of CCL2. In some embodiments, a composition as described herein includes a flavonol that reduces production of IL-1β.

As described herein, a "flavonol" refers to a molecule that have the 3-hydroxy-2-phenylchromen-4-one skeleton with different positions of the phenolic —OH groups.

Non-limiting examples of flavonol include flavan-3-ols, flavan-4-ols and flavan-3,4-diols. Examples of a flavan-3-ols include, without limitation, epicatechin, catechin, epigallocatechin, fisetinidol, EGCG. Non-limiting examples of flavans that reduces production of TNF-α include epicatechin and EGCG. Non-limiting examples of flavans that reduces production of CCL2 include epicatechin and EGCG. Non-limiting examples of flavans that reduces production of IL-1β include epicatechin and EGCG.

Retinoic Acids

In some embodiments, a composition as described herein includes a retinoic acid that reduces production of TNF-α. In some embodiments, a composition as described herein includes a retinoic acid that reduces production of CCL2. In some embodiments, a composition as described herein includes a retinoic acid that reduces production of IL-1β.

As described herein a "retinoic acid" refers to a compound containing all four exocyclic double bonds with E-(trans-) geometry.

Non-limiting examples of a retinoic acid include all-trans-retinol. Examples of all-trans-retinol include vitamin A and 13,14-dihydroretinoic acid. Non-limiting examples of retinoic acids that can reduce ROS concentration include vitamin A.

Flavones

In some embodiments, a composition as described herein includes a flavones that reduces production of TNF-α. In some embodiments, a composition as described herein includes a flavones that reduces production of CCL2. In some embodiments, a composition as described herein includes a flavones that reduces production of IL-1β.

As described herein, a "flavone" refers to a molecule derived from the oxidation of a flavan to form a phenylbenzopyranone motif.

Non-limiting examples of flavones include pentahydroxyflavones, tetrahydroxyflavones, trihydroxyflavones, hydroxyflavones, and flavanols. Examples of a pentahydroxyflavone include, without limitation, macaranone A; quercetin; broussonol E; cannabiscitrin; and tricetin. Examples of a tetrahydroxyflavone include, without limitation, nigrasin I, rutin, macaranone B, luteolin, and avicularin.

Non-limiting examples of pentahydroxyflavone that can reduce production of TNF-α include quercetin. Non-limiting examples of pentahydroxyflavone that can reduce production of CCL2 include quercetin. Non-limiting examples of pentahydroxyflavone that can reduce production of IL-1β include quercetin. Non-limiting examples of tetrahydroxyflavone that can reduce production of TNF-α include luteolin. Non-limiting examples of tetrahydroxyflavone that can reduce production of CCL2 include luteolin. Non-limiting examples of tetrahydroxyflavone that can reduce production of IL-1β include luteolin.

Carboxylic Acid

In In some embodiments, a composition as described herein includes a carboxylic acid that reduces production of TNF-α. In some embodiments, a composition as described herein includes a carboxylic acid that reduces production of CCL2. In some embodiments, a composition as described herein includes a carboxylic acid that reduces production of IL-1β.

As described herein a "carboxylic acid" refers to a compound containing a —COOH.

Non-limiting examples of a carboxylic acid include ketoaldonic acid. Examples of ketoaldonic acid include, without limitation, D- or L-ascorbic acid (vitamin C), erythorbic acid, and gulonic acid. Non-limiting examples of ketoaldonic acid that can reduce production of TNF-α include vitamin C. Non-limiting examples of ketoaldonic acid that can reduce production of CCL2 include vitamin C. Non-limiting examples of ketoaldonic acid that can reduce production of IL-1β include vitamin C.

Carotenes

In some embodiments, a composition as described herein includes a carotene that reduces production of TNF-α. In some embodiments, a composition as described herein includes a carotene that reduces production of CCL2. In some embodiments, a composition as described herein includes a carotene that reduces production of IL-1β.

As described herein a "carotene" refers to a polyunsaturated hydrocarbon compound containing 40 carbon atoms per molecule, variable numbers of hydrogen atoms, and no other elements.

Non-limiting examples of a carotenes include an acyclic carotene. Examples of an acyclic carotene include, without limitation, proneurosporene, lycopersene, lycopene, and phytoene. Non-limiting examples of acyclic carotene that can reduce production of TNF-α include lycopene. Non-limiting examples of acyclic carotene that can reduce production of CCL2 include lycopene. Non-limiting examples of acyclic carotene that can reduce production of IL-1β include lycopene.

Benzopyrans

In some embodiments, a composition as described herein includes a benzopyran that reduces production of TNF-α. In some embodiments, a composition as described herein includes a benzopyran that reduces production of CCL2. In some embodiments, a composition as described herein includes a benzopyran that reduces production of IL-1β.

As described herein, a "benzopyran" refers to a polycyclic organic compound comprising a benzene ring fused to a pyran ring.

Non-limiting examples of benzopyran include chromonols. Examples of a chromonols include, without limitation, α-tocopherol, β-tocopherol, γ-tocopherol, and β-tocopherol (vitamin E). Non-limiting examples of benzopyran that can decrease oxidative stress include α-tocopherol, β-tocopherol, γ-tocopherol, and δ-tocopherol (vitamin E).

Dietary Supplemental Compositions

The present disclosure provides compositions (e.g., dietary supplements) containing two or more agents that decrease the production of TNF-α, decrease the production of CCL2, decrease production of IL-1β, or a combination thereof. For example, in some embodiments, the present disclosure provides a compositions comprising two or more agents that decrease the production of TNF-α. As another example, in some embodiments, the present disclosure provides a composition comprising two or more agents that decrease the production of TNF-α; decrease the production of CCL2; or a combination thereof. As another example, in some embodiments, the present disclosure provides a composition comprising two or more agents that decrease the production of TNF-α; decrease the production of CCL2; decrease production of IL-1β; or a combination thereof. In some embodiments, the present disclosure provides compositions comprising a flavonol, a carotene, a flavone, a retinoic acid, a ketaldonic acid, and a benzopyran. Such compositions can be used to decrease LGCI. In addition, the disclosure provides methods for relieving symptoms caused by LGCI associated with one or more of: cellular toxicity; infection; cancer; cardiovascular diseases such as atherosclerosis; neurodegenerative diseases such as Parkinson's disease, Alzheimer's disease, amyotrophic lateral sclerosis (ALS), multiple sclerosis, depression, and memory loss; obesity, osteoarthritis; stress; diabetes mellitus; or aging. Such methods involve the administration of a composition as provided herein.

In some embodiments, a composition as described herein includes two or more agents that decrease production of TNF-α. In some embodiments, at least one of the agents that decrease production of TNF-α also decreases production of CCL2. In some embodiments, at least one of the agents that decrease production of TNF-α and production of CCL2 also decreases production of IL-1β. In some embodiments, the two or more agents that decrease LGCI include a flavonol, a carotene, a flavone, a retinoic acid, a ketaldonic acid, and a benzopyran.

In some embodiments, a composition as described herein includes a flavonol that can modulate LGCI. In some embodiments, a composition as described herein includes a flavonol that decreases production of TNF-α. In some embodiments, a composition as described herein includes a flavonol that decreases production of CCL2. In some embodiments, a composition as described herein includes a flavonol that decreases production of IL-1β.

As described herein, a "flavonol" refers to a molecule that have the 3-hydroxy-2-phenylchromen-4-one skeleton with different positions of the phenolic —OH groups. Non-limiting examples of flavonol include flavan-3-ols, flavan-4-ols and flavan-3,4-diols. Examples of a flavan-3-ols include, without limitation, epicatechin, catechin, epigallocatechin, fisetinidol, EGCG. Non-limiting examples of flavonoids that can decrease production of TNF-α, decrease production of CCL2, decrease production of IL-1β, or a combination thereof, include epicatechin, catechin, epigallocatechin, fisetinidol, EGCG.

In some embodiments, a flavonol is present in an amount of about 0.001% to about 5% w/w of the composition. For example, about 0.001% to about 0.5%, about 0.001% to about 1%, about 0.001% to about 2%, about 0.001% to about 3%, about 0.001% to about 4%, about 0.001% to about 4.9%, about 4.9% to about 5%, about 4% to about 5%, about 3% to about 5%, about 2% to about 4%, about 1% to about 5%, and about 0.05% to about 5% of the composition. In some embodiments, a flavonol is present in an amount of about 0.25% to about 1% w/w of the composition. For example, about 0.25% to about 0.45%, about 0.25% to about 0.65%, about 0.25% to about 0.85%, about 0.25% to about 0.95%, about 0.95% to about 1%, about 0.85% to about 1%, about 0.65% to about 1%, and about 0.45% to about 1% of the composition. In some embodiments, a flavonol is present in an amount of about 0.3%, about 0.35%, about 0.4%, about 0.45%, about 0.5%, about 0.55%, about 0.6%, about 0.65%, about 0.7%, about 0.75 about 0.8%, about 0.85%, about 0.9%, about 0.95%, or about 1% w/w of the composition.

In some embodiments, the flavonol is a flavan 3-ols. In some embodiments, the flavan 3-ol is selected from the group consisting of: epicatechin, catechin, epigallocatechin, fisetinidol, EGCG, and a combination thereof.

In some embodiments, the flavonol is epicatechin. In some embodiments, epicatechin is present in an amount of about bout 0.001% to about 5% w/w of the composition. For example, about 0.001% to about 0.5%, about 0.001% to about 1%, about 0.001% to about 2%, about 0.001% to about 3%, about 0.001% to about 4%, about 0.001% to about 4.9%, about 4.9% to about 5%, about 4% to about 5%, about 3% to about 5%, about 2% to about 4%, about 1% to about 5%, and about 0.05% to about 5% of the composition. In some embodiments, epicatechin is present in an amount of 0.25% to about 1% w/w of the composition. For example about 0.25% to about 0.45%, about 0.25% to about 0.65%, about 0.25% to about 0.85%, about 0.25% to about 0.95%, about 0.95% to about 1%, about 0.85% to about 1%, about 0.65% to about 1%, and about 0.45% to about 1% of the composition. In some embodiments, epicatechin is present in an amount of about 0.3%, about 0.35%, about 0.4%, about 0.45%, about 0.5%, about 0.55%, about 0.6%, about 0.65%, about 0.7%, about 0.75 about 0.8%, about 0.85%, about 0.9%, about 0.95%, or about 1% w/w of the composition.

In some embodiments, a composition as described herein includes a flavonol that can modulate LGCI. In some embodiments, a composition as described herein includes a flavonol that decreases production of TNF-α. In some embodiments, a composition as described herein includes a flavonol that decreases production of CCL2. In some embodiments, a composition as described herein includes a flavonol that decreases production of IL-1β.

As described herein, a "flavonol" refers to a molecule that have the 3-hydroxy-2-phenylchromen-4-one skeleton with different positions of the phenolic —OH groups. Non-limiting examples of flavonol include flavan-3-ols, flavan-4-ols and flavan-3,4-diols. Examples of a flavan-3-ols include, without limitation, epicatechin, catechin, epigallocatechin, fisetinidol, EGCG. Non-limiting examples of flavonoids that can decrease production of TNF-α, decrease production of CCL2, decrease production of IL-1β, or a combination thereof, include epicatechin, catechin, epigallocatechin, fisetinidol, EGCG.

In some embodiments, a flavonol is present in an amount of about 0.001% to about 5% w/w of the composition. For example, about 0.001% to about 0.5%, 0.001% to about 1%, about 0.001% to about 2%, about 0.001% to about 3%, about 0.001% to about 4%, about 0.001% to about 4.9%, about 4.9% to about 5%, about 4% to about 5%, about 3% to about 5%, about 2% to about 5%, about 1% to about 5%, and about 0.5% to about 5% w/w of the composition. In some embodiments, a flavonol is present in an amount of about 0.005% to about 1% w/w of the composition. For example, about 0.005% to about 0.15%, about 0.005% to about 0.25%, about 0.005% to about 0.35%, about 0.005% to about 0.45%, about 0.005% to about 0.55%, about 0.005% to about 0.65%, about 0.005% to about 0.75%, about 0.005% to about 0.85%, about 0.005% to about 0.95%, about 0.95% to about 1%, about 0.85% to about 1%, about 0.75% to about 1%, about 0.65% to about 1%, about 0.55% to about 1%, about 0.45% to about 1%, about 0.35% to about 1%, about 0.25% to about 1%, and about 0.15% to about 1% w/w of the composition. In some embodiments, a flavonol is present in an amount of about 0.01%, about 0.15%, about 0.2%, about 0.25%, about 0.3%, about 0.35%, about 0.4%, about 0.5%, about 0.6%, about 0.7%, about 0.8%, about 0.9%, or about 1% w/w of the composition.

In some embodiments, the flavonol is a flavan 3-ols. In some embodiments, the flavan 3-ol is selected from the group consisting of: EGCG; theaflavin 3,3'-digallate; (S)-2-hydroxynaringenin; prunin 6"-O-gallate; and, a combination thereof.

In some embodiments, the flavonol is EGCG. In some embodiments, EGCG is present in an amount of about 0.001% to about 2% w/w of the composition. For example, about 0.001% to about 0.5%, 0.001% to about 1%, about 0.001% to about 2%, about 0.001% to about 3%, about 0.001% to about 4%, about 0.001% to about 4.9%, about 4.9% to about 5%, about 4% to about 5%, about 3% to about 5%, about 2% to about 5%, about 1% to about 5%, or about 0.5% to about 5% w/w of the composition. In some embodiments, EGCG is present in an amount of about 0.005% to about 1% w/w of the composition. For example, about 0.005% to about 0.15%, about 0.005% to about 0.25%, about 0.005% to about 0.35%, about 0.005% to about 0.45%, about 0.005% to about 0.55%, about 0.005% to about 0.65%, about 0,005% to about 0.75%, about 0.005% to about 0.85%, about 0.005% to about 0.95%, about 0.95% to about 1%, about 0.85% to about 1%, about 0.75% to about 1%, about 0.65% to about 1%, about 0.55% to about 1%, about 0.45% to about 1%, about 0.35% to about 1%, about 0.25% to about 1%, or about 0.15% to about 1% w/w of the composition. In some embodiments, EGCG is present in an amount of about 0.01%, about 0.15%, about 0.2%, about 0.25%, about 0.3%, about 0.35%, about 0.4%, about 0.5%, about 0.6%, about 0.7%, about 0.8%, about 0.9%, or about 1% w/w of the composition.

In some embodiments, a composition as described herein includes a carotene that can modulate LGCI. In some embodiments, a composition as described herein includes a carotene that decreases production of TNF-α. In some embodiments, a composition as described herein includes a carotene that decreases production of CCL2. In some embodiments, a composition as described herein includes a carotene that decreases production of IL-1β.

As described herein a "carotene" refers to a polyunsaturated hydrocarbon compound containing 40 carbon atoms per molecule, variable numbers of hydrogen atoms, and no other elements. Non-limiting examples of a retinoic acid include acyclic carotene. Examples of acyclic carotene include proneurosporene, lycopersene, lycopene, phytoene Non-limiting examples of carotenes that can decrease production of TNF-α, decrease production of CCL2, decrease production of IL-1β, or a combination thereof, include lycopene.

In some embodiments, carotene is present in an amount of about 0.01% to about 30% w/w of the composition. For example, about 0.01% to about 1%, about 0.01% to about 5%, about 0.01% to about 10%, about 0.01% to about 15%, about 0.01% to about 20%, about 0.01% to about 25%, about 25% to about 30%, about 20% to about 30%, about 15% to about 30%, about 10% to about 30%, about 5% to about 30%, or about 1% to about 30% w/w of the composition. In some embodiments, carotene is present in an amount of about 0.2% to about 10% w/w of the composition. For example, about 0.2% to about 2%, about 0.2% to about 4%, about 0.2% to about 6%, about 0.2% to about 8%, about 0.2% to about 9%, about 9% to about 10%, about 8% to about 10%, about 6% to about 10%, about 4% to about 10%, or about 2% to about 10% w/w of the composition. In some embodiments, a carotene is present in an amount of about 0.1%, about 0.2%, about 0.3%, about 0.35%, about 0.375%, about 0.4%, about 0.425%, about 0.45%, about 0.5%, about 0.6%, about 0.8%, about 1%, about 1.5% or about 2% w/w of the composition.

In some embodiments, the carotene is an acyclic carotene. In some embodiments, the acyclic carotene is selected from the group consisting of: proneurosporene, lycopersene, lycopene, phytoene, and a combination thereof.

In some embodiments, the carotene is lycopene. In some embodiments, lycopene is present in an amount of about 0.01% to about 30% w/w of the composition. For example, about 0.01% to about 1%, about 0.01% to about 5%, about 0.01% to about 10%, about 0.01% to about 15%, about 0.01% to about 20%, about 0.01% to about 25%, about 25% to about 30%, about 20% to about 30%, about 15% to about 30%, about 10% to about 30%, about 5% to about 30%, or about 1% to about 30% w/w of the composition. In some embodiments, lycopene is present in an amount of about 0.2% to about 10% w/w of the composition. For example, about 0.2% to about 2%, about 0.2% to about 4%, about 0.2% to about 6%, about 0.2% to about 8%, about 0.2% to about 9%, about 9% to about 10%, about 8% to about 10%, about 6% to about 10%, about 4% to about 10%, or about 2% to about 10% w/w of the composition. In some embodiments, lycopene is present in an amount of about 0.1%, about 0.2%, about 0.3%, about 0.35%, about 0.375%, about 0.4%, about 0.425%, about 0.45%, about 0.5%, about 0.6%, about 0.8%, about 1%, about 1.5% or about 2% w/w of the composition.

In some embodiments, a composition as described herein includes a flavone that can modulate LGCI. In some embodiments, a composition as described herein includes a flavone that decreases production of TNF-α. In some embodiments, a composition as described herein includes a flavone that decreases production of CCL2. In some embodiments, a composition as described herein includes a flavone that decreases production of IL-1β.

As described herein, a "flavone" refers to a molecule derived from the oxidation of a flavan to form a phenylbenzopyranone motif. Non-limiting examples of flavones include pentahydroxyflavones, tetrahydroxyflavones, trihydroxyflavones, hydroxyflavones, and flavanols. Examples of a pentahydroxyflavone include, without limitation, macaranone A; quercetin; broussonol E; cannabiscitrin; and tricetin. Examples of a tetrahydroxyflavone include, without limitation, nigrasin I, rutin, macaranone B, luteolin, and avicularin. Non-limiting examples of flavone that can decrease production of TNF-α, decrease production of CCL2, decrease production of IL-1β, or a combination thereof, include quercetin and luteolin.

In some embodiments, a flavone is present in an amount of about 0.001% to about 15% w/w of the composition. For example, about 0.001% to about 1%, about 0.001% to about 5%, about 0.001% to about 10%, about 0.001% to about 14%, about 14% to about 15%, about 10% to about 15%, or about 5% to about 15% w/w of the composition. In some embodiments, the flavone is present in an amount of about 0.05% to about 5% w/w of the composition. For example, about 0.05% to about 0.5%, about 0.05% to about 1%, about 0.05% to about 2%, about 0.05% to about 3%, about 0.05% to about 4%, about 0.05% to about 4.5%, about 4.5% to about 5% a, about 4% to about 5%, about 3% to about 5%, about 2% to about 5%, about 1% to about 5%, or about 0.5% to about 5% w/w of the composition. In some embodiments, the flavone is present in an amount of about 0.01%, about 0.05%, about 0.1%, about 0.15%, about 0.2%, about 0.25%, about 0.3%, about 0.35%, about 0.4%, about 0.45%, about 0.5%, about 0.55%, about 0.58%, about 0.59%, about 0.6%, about 0.61%, about 0.62%, about 0.63%, about 0.64%, about 0.65%, about 0.7%, about 0.8%, about 0.9%, about 1%, about 2%, about 3%, about 4%, or about 5% w/w of the composition.

In some embodiments, the flavone is a pentahydroxyflavone. In some embodiments, the pentahydroxyflavone is selected from the group consisting of: macaranone A; quercetin; broussonol E; cannabiscitrin; and tricetin, and a combination thereof.

In some embodiments, the flavone is quercetin. In some embodiments, quercetin is present in an amount of about 0.001% to about 15% w/w of the composition. For example, about 0.001% to about 1%, about 0.001% to about 5%, about 0.001% to about 10%, about 0.001% to about 14%, about 14% to about 15%, about 10% to about 15%, or about 5% to about 15% w/w of the composition. In some embodiments, quercetin is present in an amount of about 0.05% to about 5% w/w of the composition. For example, about 0.05% to about 0.5%, about 0.05% to about 1%, about 0.05% to about 2%, about 0.05% to about 3%, about 0.05% to about 4%, about 0.05% to about 4.5%, about 4.5% to about 5%, about 4% to about 5%, about 3% to about 5%, about 2% to about 5%, about 1% to about 5%, or about 0.5% to about 5% w/w of the composition. In some embodiments, quercetin is present in an amount of about 0.01%, about 0.05%, about 0.1%, about 0.15%, about 0.2%, about 0.25%, about 0.3%, about 0.35%, about 0.4%, about 0.45%, about 0.5%, about 0.55%, about 0.58%, about 0.59%, about 0.6%, about 0.61%, about 0.62%, about 0.63%, about 0.64%, about 0.65%, about 0.7%, about 0.8%, about 0.9%, about 1%, about 2%, about 3%, about 4%, or about 5% w/w of the composition.

In some embodiments, a composition as described herein includes a flavone that can modulate LGCI. In some embodiments, a composition as described herein includes a flavone that decreases production of TNF-α. In some embodiments, a composition as described herein includes a flavone that decreases production of CCL2. In some embodiments, a composition as described herein includes a flavone that decreases production of IL-1β.

As described herein, a "flavone" refers to a molecule derived from the oxidation of a flavan to form a phenylbenzopyranone motif. Non-limiting examples of flavones include pentahydroxyflavones, tetrahydroxyflavones, trihydroxyflavones, hydroxyflavones, and flavanols. Examples of a pentahydroxyflavone include, without limitation, macaranone A; quercetin; broussonol E; cannabiscitrin; and tricetin.

Examples of a tetrahydroxyflavone include, without limitation, nigrasin I, rutin, macaranone B, luteolin, and avicularin. Non-limiting examples of flavone that can decrease production of TNF-α, decrease production of CCL2, decrease production of IL-1β, or a combination thereof, include quercetin and luteolin.

In some embodiments, a flavone is present in an amount of about 0.01% to about 50% w/w of the composition. For example, about 0.01% to about 5%, about 0.01% to about 10%, about 0.01% to about 15%, about 0.01% to about 20%, about 0.01% to about 25%, about 0.01% to about 30%, about 0.01% to about 35%, about 0.01% to about 40%, about 0.01% to about 45%, about 0.01% to about 49%, about 49% to about 50%, about 45% to about 50%, about 40% to about 50%, about 35% to about 50%, about 30% to about 50%, about 25% to about 50%, about 20% to about 50%, about 15% to about 50%, about 10% to about 50%, or about 5% to about 50% w/w of the composition. In some embodiments, the flavone is present in an amount of about 0.05% to about 5% w/w of the composition. For example, about 0.05% to about 0.5%, about 0.05% to about 1%, about 0.05% to about 2%, about 0.05% to about 3%, about 0.05% to about 4%, about 0.05% to about 4.5%, about 4.5% to about 5%, about 4% to about 5%, about 3% to about 5%, about 2% to about 5%, about 1% to about 5%, or about 0.5% to about 5% w/w of the composition. In some embodiments, the flavone is present in an amount of about 0.01%, about 0.05%, about 0.1%, about 0.15%, about 0.2%, about 0.25%, about 0.3%, about 0.35%, about 0.36%, about 0.37%, about 0.38%, about 0.39%, about 0.4%, about 0.41%, about 0.42%, about 0.43%, about 0.44%, about 0.45%, about 0.5%, about 1%, about 2%, about 3%, about 4%, or about 5% w/w of the composition.

In some embodiments, the flavone is a tetrahydroxyflavone. In some embodiments, the tetrahydroxyflavone is selected from the group consisting of: maysin; luteolin; nigrasin I; macaranone B; and, a combination thereof.

In some embodiments, the flavone is luteolin. In some embodiments, luteolin is present in an amount of 0.01% to about 50% w/w of the composition. For example, about 0.01% to about 5%, about 0.01% to about 10%, about 0.01% to about 15%, about 0.01% to about 20%, about 0.01% to about 25%, about 0.01% to about 30%, about 0.01% to about 35%, about 0.01% to about 40%, about 0.01% to about 45%, about 0.01% to about 49%, about 49% to about 50%, about 45% to about 50%, about 40% to about 50%, about 35% to about 50%, about 30% to about 50%, about 25% to about 50%, about 20% to about 50%, about 15% to about 50%, about 10% to about 50%, or about 5% to about 50% w/w of the composition. In some embodiments, luteolin is present in an amount of about 0.05% to about 5% w/w of the composition. For example, about 0.05% to about 0.5%, about 0.05% to about 1%, about 0.05% to about 2%, about 0.05% to about 3%, about 0.05% to about 4%, about 0.05% to about 4.5%, about 4.5% to about 5%, about 4% to about 5%, about 3% to about 5%, about 2% to about 5%, about 1% to about 5%, or about 0.5% to about 5% w/w of the composition. In some embodiments, the flavone is present in an amount of about 0.01%, about 0.05%, about 0.1%, about 0.15%, about 0.2%, about 0.25%, about 0.3%, about 0.35%, about 0.36%, about 0.37%, about 0.38%, about 0.39%, about 0.4%, about 0.41%, about 0.42%, about 0.43%, about 0.44%, about 0.45%, about 0.5%, about 1%, about 2%, about 3%, about 4%, or about 5% w/w of the composition.

In some embodiments, a composition as described herein includes a retinoic acid that can modulate LGCI. In some embodiments, a composition as described herein includes a retinoic acid that decreases production of TNF-α. In some embodiments, a composition as described herein includes a retinoic acid that decreases production of CCL2. In some embodiments, a composition as described herein includes a retinoic acid that decreases production of IL-1β.

As described herein a "retinoic acid" refers to a compound containing all four exocyclic double bonds with E-(trans-) geometry. Non-limiting examples of a retinoic acid include all-trans-retinol. Examples of all-trans-retinol include vitamin A and 13,14-dihydroretinoic acid. Non-limiting examples of retinoic acids that can decrease production of TNF-α, decrease production of CCL2, decrease production of IL-1β, or a combination thereof, include vitamin A.

In some embodiments, a retinoic acid is present in an amount of about 0.01% to about 30% w/w of the composition. For example, about 0.01% to about 1%, about 0.01% to about 5%, about 0.01% to about 10%, about 0.01% to about 15%, about 0.01% to about 20%, about 0.01% to about 25%, about 25% to about 30%, about 20% to about 30%, about 15% to about 30%, about 10% to about 30%, about 5% to about 30%, or about 1% to about 30% w/w of the composition. In some embodiments, a retinoic acid is present in an amount of about 1% to about 7.5% w/w of the composition. For example, about 1% to about 1.5%, about 1% to about 2%, about 1% to about 2.5%, about 1% to about 3%, about 1% to about 4.5%, about 1% to about 5.5%, about 1% to about 6%, about 1% to about 6.5%, about 1% to about 7%, about 7% to about 7.5%, about 6.5% to about 7.5%, about 6% to about 7.5%, about 5.5% to about 7.5%, about 5% to about 7.5%, about 4.5% to about 7.5%, about 4% to about 7.5%, about 3.5% to about 7.5%, about 3% to about 7.5%, about 2.5% to about 7.5%, about 2% to about 7.5%, or about 1.5% to about 7.5% w/w of the composition. In some embodiments, a retinoic acid is present in an amount of about 2%, about 2.2%, about 2.4%, about 2.6%, about 2.8%, about 3%, about 3.2%, about 3.4%, about 3.6%, about 3.8%, about 4%, about 4.1%, about 4.2%, about 4.3%, about 4.4%, about 4.5%, about 4.8%, about 5%, about 5.5%, about 6%, about 8%, or about 10% w/w of the composition.

In some embodiments, the retinoic acid is a all-trans-retinol. In some embodiments, the retinoic acid is selected from the group consisting of: vitamin A and 13,14-dihydroretinoic acid, and a combination thereof.

In some embodiments, the carboxylic acid is vitamin A. In some embodiments, vitamin A is present in an amount of about 0.01% to about 30% w/w of the composition. For example, about 0.01% to about 1%, about 0.01% to about 5%, about 0.01% to about 10%, about 0.01% to about 15%, about 0.01% to about 20%, about 0.01% to about 25%, about 25% to about 30%, about 20% to about 30%, about 15% to about 30%, about 10% to about 30%, about 5% to about 30%, or about 1% to about 30% w/w of the composition. In some embodiments, vitamin A is present in an amount of about 1% to about 7.5% w/w of the composition. For example, about 1% to about 1.5%, about 1% to about 2%, about 1% to about 2.5%, about 1% to about 3%, about 1% to about 4.5%, about 1% to about 5.5%, about 1% to about 6%, about 1% to about 6.5%, about 1% to about 7%, about 7% to about 7.5%, about 6.5% to about 7.5%, about 6% to about 7.5%, about 5.5% to about 7.5%, about 5% to about 7.5%, about 4.5% to about 7.5%, about 4% to about 7.5%, about 3.5% to about 7.5%, about 3% to about 7.5%, about 2.5% to about 7.5%, about 2% to about 7.5%, or about 1.5% to about 7.5% w/w of the composition. In some embodiments, vitamin A is present in an amount of about 2%, about 2.2%, about 2.4%, about 2.6%, about 2.8%, about 3%, about 3.2%, about 3.4%, about 3.6%, about 3.8%, about 4%, about 4.1%, about 4.2%, about 4.3%, about 4.4%, about 4.5%, about 4.8%, about 5%, about 5.5%, about 6%, about 8%, or about 10% w/w of the composition.

In some embodiments, a composition as described herein includes a carboxylic acid that can modulate LGCI. In some embodiments, a composition as described herein includes a carboxylic acid that decreases production of TNF-α. In some embodiments, a composition as described herein includes a carboxylic acid that decreases production of CCL2. In some embodiments, a composition as described herein includes a carboxylic acid that decreases production of IL-1β.

As described herein a "carboxylic acid" refers to a compound containing a —COOH. Non-limiting examples of a carboxylic acid include ketoaldonic acid. Examples of ketoaldonic acid include, without limitation, D- or L-ascorbic acid (vitamin C), erythorbic acid, and gulonic acid.

In some embodiments, a carboxylic acid is present in an amount of about 1% to about 99% w/w of the composition. For example, about 1% to about 15%, about 1% to about 25%, about 1% to about 35%, about 1% to about 45%, about 1% to about 55%, about 1% to about 65%, about 1% to about 75%, about 1% to about 85%, about 1% to about 95%, about 95% to about 99%, about 85% to about 99%, about 75% to about 99%, about 65 to about 99%, about 55% to about 99%, about 45% to about 99%, about 35% to about 99%, about 25% to about 99%, or about 15% to about 99% w/w of the composition. In some embodiments, a carboxylic acid is present in an amount of about 40% to about 77% w/w of the composition. For example, about 40% to about 50%, about 40% to about 55%, about 40% to about 60%, about 40% to about 65%, about 40% to about 70%, about 70% to about 77%, about 65% to about 77%, about 60% to about 77%, about 55% to about 77%, or about 50% to about 75% w/w of the composition. In some embodiments, a carboxylic acid is present in an amount of about 50%, about 52%, about 54%, about 56%, about 58%, about 60%, about 60.5%, about 61%, about 61.2%, about 61.4%, about 61.5%, about 61.6%, about 61.7%, about 61.8%, about 61.9%, about 62%, about 65%, about 70%, about 75%, or about 80% w/w of the composition.

In some embodiments, the carboxylic acid is a ketoaldonic acid. In some embodiments, the ketoaldonic acid is selected from the group consisting of: D- or L-ascorbic acid (vitamin C), erythorbic acid, gulonic acid, and a combination thereof.

In some embodiments, the carboxylic acid is ascorbic acid (vitamin C). In some embodiments, vitamin C is present in an amount of about 1% to about 99% w/w of the composition. For example, about 1% to about 15%, about 1% to about 25%, about 1% to about 35%, about 1% to about 45%, about 1% to about 55%, about 1% to about 65%, about 1% to about 75%, about 1% to about 85%, about 1% to about 95%, about 95% to about 99%, about 85% to about 99%, about 75% to about 99%, about 65 to about 99%, about 55% to about 99%, about 45% to about 99%, about 35% to about 99%, about 25% to about 99%, or about 15% to about 99% w/w of the composition. In some embodiments, vitamin C is present in an amount of about 40% to about 77% w/w of the composition. For example, about 40% to about 50%, about 40% to about 55%, about 40% to about 60%, about 40% to about 65%, about 40% to about 70%, about 70% to about 77%, about 65% to about 77%, about 60% to about 77%, about 55% to about 77%, or about 50% to about 75% of the composition. In some embodiments, vitamin C is present in an amount of 50%, about 52%, about 54%, about 56%, about 58%, about 60%, about 60.5%, about 61%, about 61.2%, about 61.4%, about 61.5%, about 61.6%, about 61.7%, about 61.8%, about 61.9%, about 62%, about 65%, about 70%, about 75%, or about 80% w/w of the composition.

In some embodiments, a composition as described herein includes a benzopyran that can modulate LGCI. In some embodiments, a composition as described herein includes a benzopyran that decreases production of TNF-α. In some embodiments, a composition as described herein includes a benzopyran that decreases production of CCL2. In some embodiments, a composition as described herein includes a benzopyran that decreases production of IL-1β.

As described herein, a "benzopyran" refers to a polycyclic organic compound comprising a benzene ring fused to a pyran ring. Non-limiting examples of benzopyran include chromonols. Examples of a chromonols include, without limitation, α-tocopherol, β-tocopherol, γ-tocopherol, and δ-tocopherol (vitamin E).

In some embodiments, a benzopyran is present in an amount of about 1% to about 90% w/w of the composition. For example, about 1% to about 5%, about 1% to about 15%, about 1% to about 25%, about 1% to about 35%, about 1% to about 45%, about 1% to about 55%, about 1% to about 65%, about 1% to about 75%, about 1% to about 85%, about 85% to about 90%, about 75% to about 90%, about 65% to about 90%, about 55% to about 90%, about 45% to about 90%, about 35% to about 90%, about 25% to about 90%, about 15% to about 90%, or about 5% to about 90% w/w of the composition. In some embodiments, a benzopyran is present in an amount of about 15% to about 40% w/w of the composition. For example, about 15% to about 20%, about 15% to about 25%, about 15% to about 30%, about 15% to about 35%, about 35% to about 40%, about 30% to about 40%, about 25% to about 40%, or about 20% to about 40% w/w of the composition. In some embodiments, a benzopyran is present in an amount of about 2%, about 15%, about 20%, about 22%, about 24%, about 25%, about 26%, about 26.2%, about 26.4%, about 26.8%, about 26.81%, about 26.82%, about 26.83%, about 26.85%, about 27%, about 28%, about 29%, about 30%, about 32%, about 34%, or about 35% w/w of the composition.

In some embodiments, the benzopyran is a chromanol. In some embodiments, the chromanol is selected from the group consisting of: α-tocopherol, β-tocopherol, γ-tocopherol, δ-tocopherol, α-tocotrienol, β-tocotrienol, γ-tocotrienol, δ-tocotrienol, vitamin E and a combination thereof.

In some embodiments, the benzopyran is vitamin E. In some embodiments, vitamin E is present in an amount of about 1% to about 90% w/w of the composition. For example, about 1% to about 5%, about 1% to about 15%, about 1% to about 25%, about 1% to about 35%, about 1% to about 45%, about 1% to about 55%, about 1% to about 65%, about 1% to about 75%, about 1% to about 85%, about 85% to about 90%, about 75% to about 90%, about 65% to about 90%, about 55% to about 90%, about 45% to about 90%, about 35% to about 90%, about 25% to about 90%, about 15% to about 90%, or about 5% to about 90% w/w of the composition. In some embodiments, vitamin E is present in an amount of about 15% to about 40% w/w of the composition. For example, about 15% to about 20%, about 15% to about 25%, about 15% to about 30%, about 15% to about 35%, about 35% to about 40%, about 30% to about 40%, about 25% to about 40%, or about 20% to about 40% w/w of the composition. In some embodiments, a benzopyran is present in an amount of about 2%, about 15%, about 20%, about 22%, about 24%, about 25%, about 26%, about 26.2%, about 26.4%, about 26.8%, about 26.81%, about 26.82%, about 26.83%, about 26.85%, about 27%, about 28%, about 29%, about 30%, about 32%, about 34%, or about 35% w/w of the composition. In some embodiments, the vitamin E is present in an amount of about 2%, about 15%, about 20%, about 22%, about 24%, about 25%, about 26%, about 26.2%, about 26.4%, about 26.8%, about 26.81%, about 26.82%, about 26.83%, about 26.85%, about 27%, about 28%, about 29%, about 30%, about 32%, about 34%, or about 35% w/w of the composition.

In some of any of the above embodiments, the composition further comprises one or more excipients, diluents, or carriers.

In some embodiments, a composition as described herein is formulated for oral delivery. A composition as described herein can be formulated for oral delivery in a variety of ways. For example, the composition can be in the form of a tablet or powder. As another example, a composition as described herein can be in the form of a liquid, solution, suspension, gummy, tablet, powder, soft gelatin capsules, or hard gelatin capsules. Commercial dietary supplements are generally formulated for oral administration. For oral administration, tablets or capsules can be prepared by conventional means with pharmaceutically acceptable excipients such as binding agents, fillers, lubricants, disintegrants, or wetting agents. The tablets can be coated by methods known in the art. Liquid preparations for oral administration can take the form of, for example, solutions, syrups, or suspension, or they can be presented as a dry product for constitution with saline or other suitable liquid vehicle before use. For example, a composition as described herein can be presented as dry powder and dissolved in a suitable liquid carrier. In some embodiments, a composition as described herein can be diluted in a suitable liquid carrier. In some embodiments, a composition as described herein is diluted in an energy drink. In some embodiments, liquid preparations also can contain pharmaceutically acceptable additives such as suspending agents, emulsifying agents, non-aqueous vehicles, preservatives, buffer salts, flavoring agents, coloring agents, and sweetening agents as appropriate. In some embodiments, a composition as described herein can be presented as a stick pack. Preparations for oral administration can be suitably formulated to give controlled release of the compound.

Tablets and powders can be configured to have a unit dosage equal to the daily desired dosage. For example, if a subject desires 1000 mg of a particular composition, each tablet can be 1000 mg in weight. As another example, if a subject desires 1000 mg of a particular composition each tablet can be 500 mg in weight and the subject can take two tablets. The dosages of a particular composition will depend on many factors including the mode of administration. As an example, a composition as described herein can be formulated in a dose such that an individual receives the weight percentages as shown in Table 1, e.g., in a single tablet, divided among 2 or more tablets, or as a powder.

TABLE 1

| Components | Weight Percentage (%) |
| --- | --- |
| Epicatechin | 0.7% |
| EGCG | 0.04% |
| Lycopene | 1.6% |
| Quercetin | 0.6% |
| Luteolin | 0.04% |

TABLE 1-continued

| Components | Weight Percentage (%) |
| --- | --- |
| Vitamin A | 4.3% |
| Vitamin C | 61.6% |
| Vitamin E | 26.82% |

In addition, a composition provided herein can contain a pharmaceutically acceptable carrier for in vivo administration to a subject. Such pharmaceutically acceptable carriers include, without limitation, sterile aqueous or non-aqueous solutions, suspensions, and emulsions. Examples of non-aqueous solvents include, without limitation, propylene glycol, polyethylene glycol, vegetable oils, and injectable organic esters. Aqueous carriers include water, alcohol, saline, and buffered solutions. Pharmaceutically acceptable carriers also can include physiologically acceptable aqueous vehicles (e.g., physiological saline) or other known carriers appropriate to specific routes of administration. Preservatives, flavorings, and other additives such as, for example, proteins, anti-microbials, chelating agents, inert gases, and the like also can be present in a composition.

Methods

Also provided herein are methods for decreasing LGCI in a subject in need thereof comprising administering to the subject any of the compositions as described herein. Also provided herein are methods for decreasing LGCI levels in a subject in need thereof comprising administering to the subject any of the compositions as described herein.

In some embodiments, LGCI is associated with one or more of: cellular toxicity, infection, cancer, cardiovascular diseases such as atherosclerosis, neurodegenerative diseases such as Parkinson's disease, Alzheimer's disease, amyotrophic lateral sclerosis (ALS), multiple sclerosis, depression, and memory loss, obesity, osteoarthritis, stress, diabetes mellitus, or aging.

In some embodiments, the composition is administered orally.

EXAMPLES

Example 1. In Silico Simulations of Compositions for Reducing LGCI

Protocol

The in silico simulations were performed using CytoSolve®, a commercially available tool that enables the computational modeling of biomolecular pathways. CytoSolve® can scale and model highly complex biomolecular phenomena by its ability to integrate and couple the computations of smaller biomolecular pathways (see, e.g., Ayyadurai et al. Cancers. 2022, 14, 756; Ayyadurai and Deonikar, Clin. Nutr. ESPEN, 2021, 46, pp. 439-452; Ayyadurai and Forbes-Dewey Jr. Cellular and Molecular Bioengineering. 2011, 4(1):28-45; Nordsletten. IEEE Trans Biomed Eng. 2011; 58(12):3508-12; Ayyadurai and Deonikar. Agricultural Sciences. 2015; 6:630-662; Ayvadurai. Commun Med Care Compunetics. 2011; 1:115-168; Koo et al. Biophys J. 2013:104(10):2295-306; Sweeney et al. Nat Neurosci. 2016: 19(6):771-83; and Ayyadurai. (2007) Scalable Computational Architecture for Integrating Biological Pathway Models (Doctoral Dissertation, Massachusetts Institute of Technology); each of which is hereby incorporated by reference in its entirety).

CytoSolve® platform was used to model mechanisms of LGCI in adipocytes that included production of TNF-α, CCL2, and IL-1β. Once these pathways were integrated using CytoSolve®, the resulting biomolecular computational model was used to identify the ranges of concentrations of epicatechin, EGCG, lycopene, quercetin, luteolin, vitamin A, vitamin C, and vitamin E, which elicit a synergistic effect on the biomarkers, TNF-α, CCL2, and IL-1β (see Table 1). Three scenarios were simulated biomolecular computational model on the CytoSolve® platform over a period of about seven and thirty days days: 1) Control (TNF-α, CCL2, and IL-1β concentrations without the supplementation of the composition described herein); 2) Effect of composition herein in Table 1 on TNF-α, CCL2, and IL-1β concentration over a period of seven (7) days; and, 3) Effect of composition herein in Table 1 on TNF-α, CCL2, and IL-1β concentration over a period of thirty (30) days. The amounts of epicatechin, EGCG, lycopene, quercetin, luteolin, vitamin A, vitamin C, and vitamin E, from Table 1 were used to model the individual as well as synergistic effect on TNF-α, CCL2, and IL-1β concentration versus the control over a period of seven (7) and thirty (30) days of supplementation.

Results

FIG. 1 was derived using CytoSolve® to model mechanisms of LGCI in adipocytes and pancreatic islet cells. The results in FIG. 1 represent steady state concentrations of TNF-α for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the TNF-α levels are 0.65 nM, whereas for in individuals experiencing LGCI, the TNF-α levels fell to 0.0032 nM, 0.17 nM, 0.0033 nM, 0.19 nM, 0.16 nM, 0.003 nM, 0.014 nM, and 0.002 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the TNF-α fell to $9.56 \times 10^{-10}$ nM. These results show that individually as well as in combination, epicatechin, EGCG, lycopene, quercetin, luteolin, vitamin A, vitamin C, and vitamin E, from Table 1 are able to reduce the TNF-α levels significantly.

Figure 2:
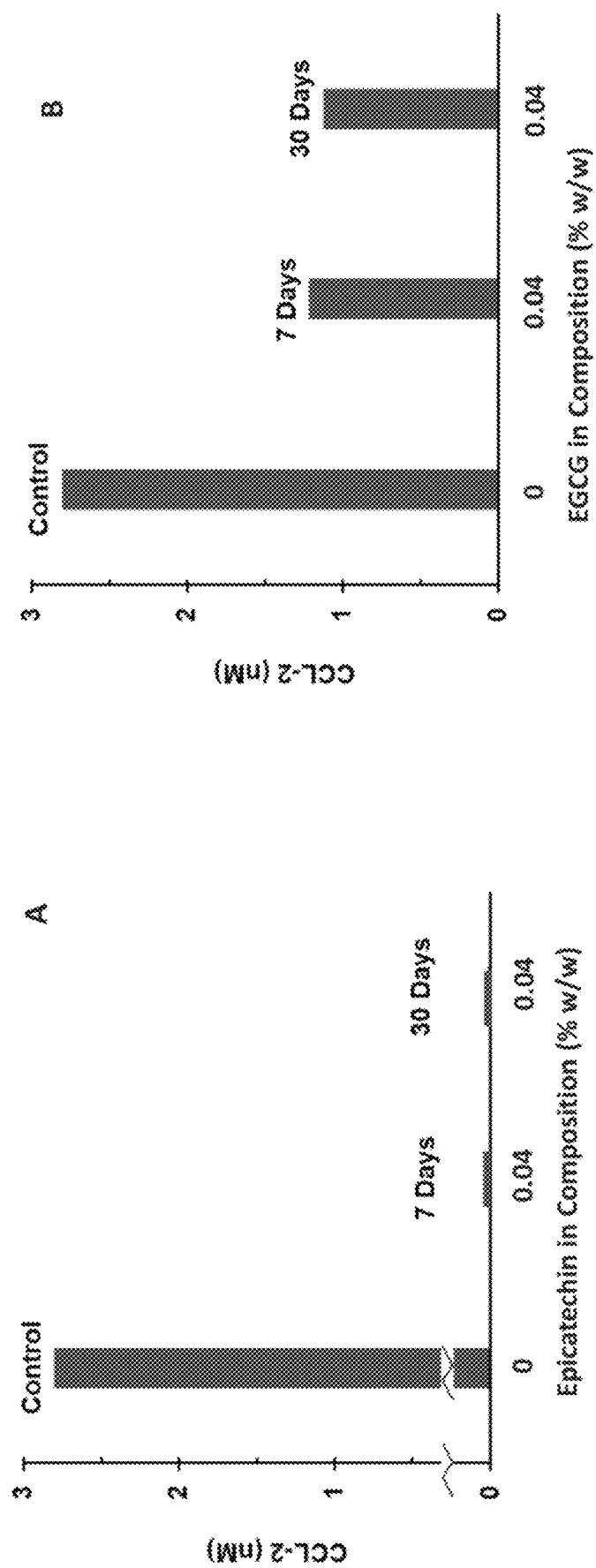
FIG. 2 shows bar graphs comparing the steady state concentrations of CCL2 for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the CCL2 levels are 2.8 nM, whereas for in individuals experiencing LGCI, the CCL2 levels fell to 0.015 nM, 1.12 nM, 0.015 nM, 1.19 nM, 0.98 nM, 0.015 nM, 0.0011 nM, and 0.012 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the CCL2 fell to $9.48 \times 10^{-7}$ nM.
Figure 2:
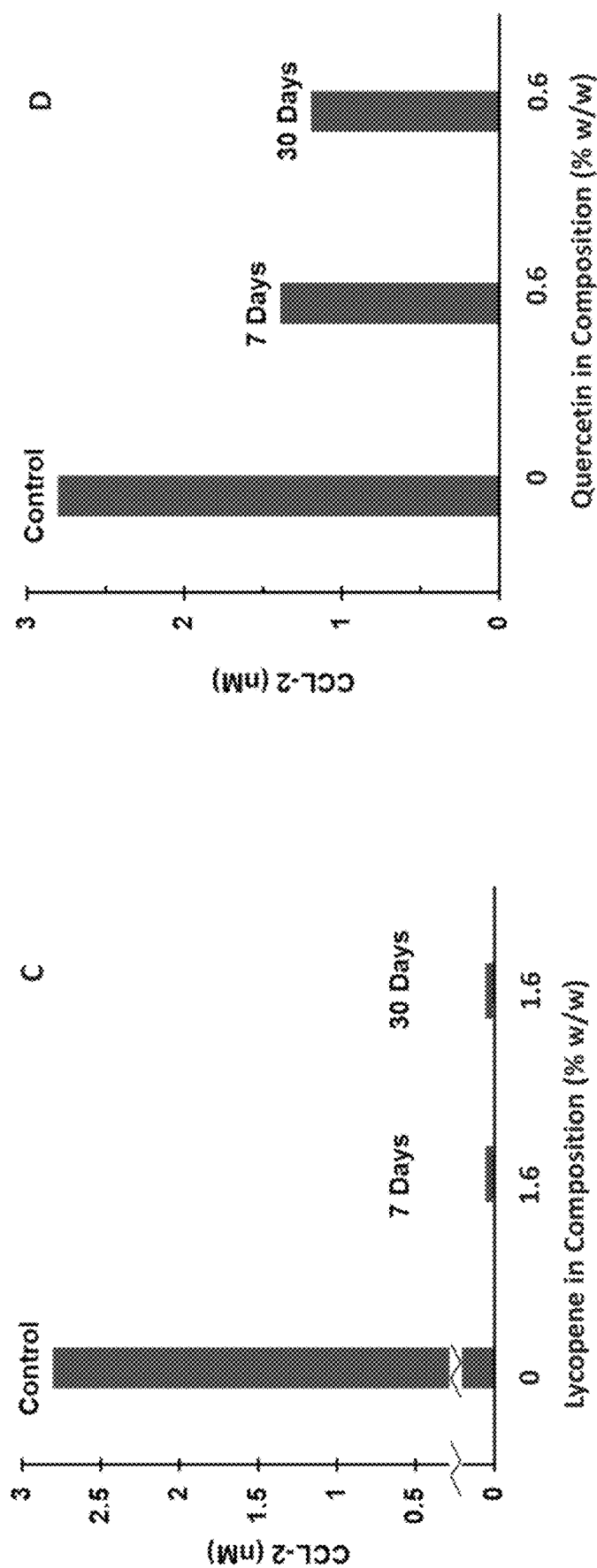
Figure 2:
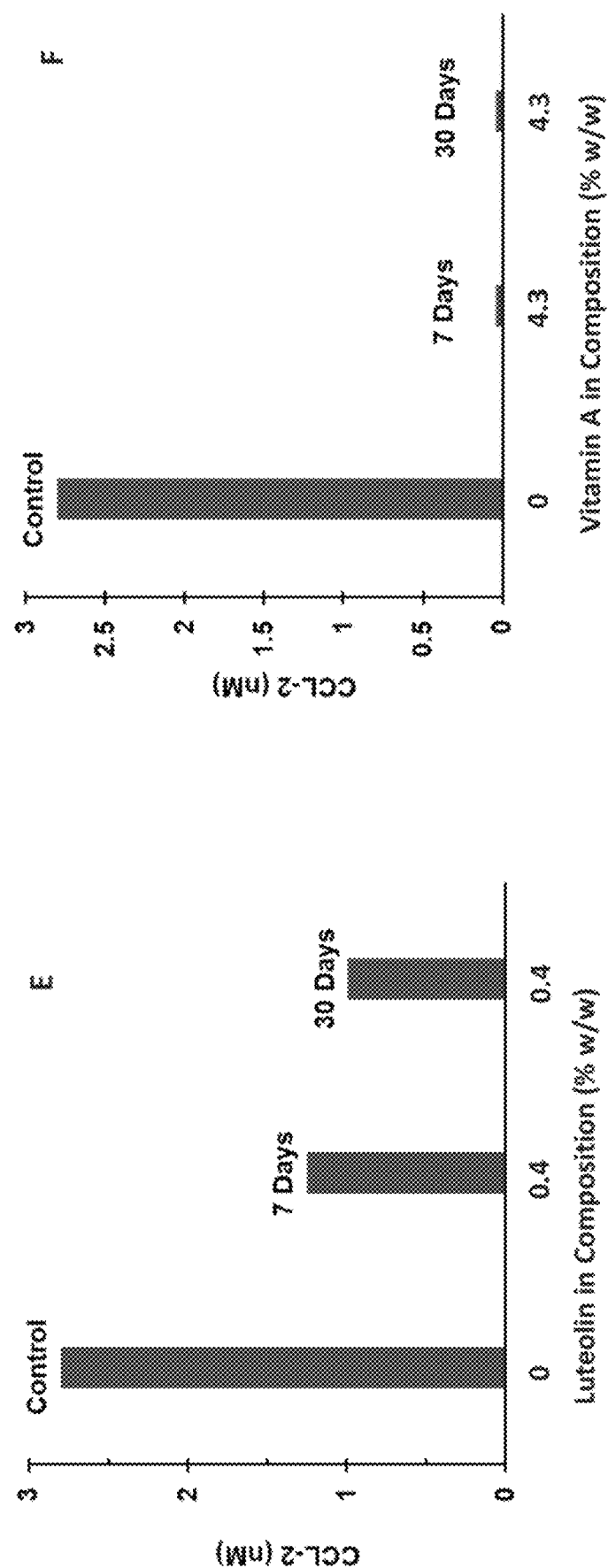
Figure 2:
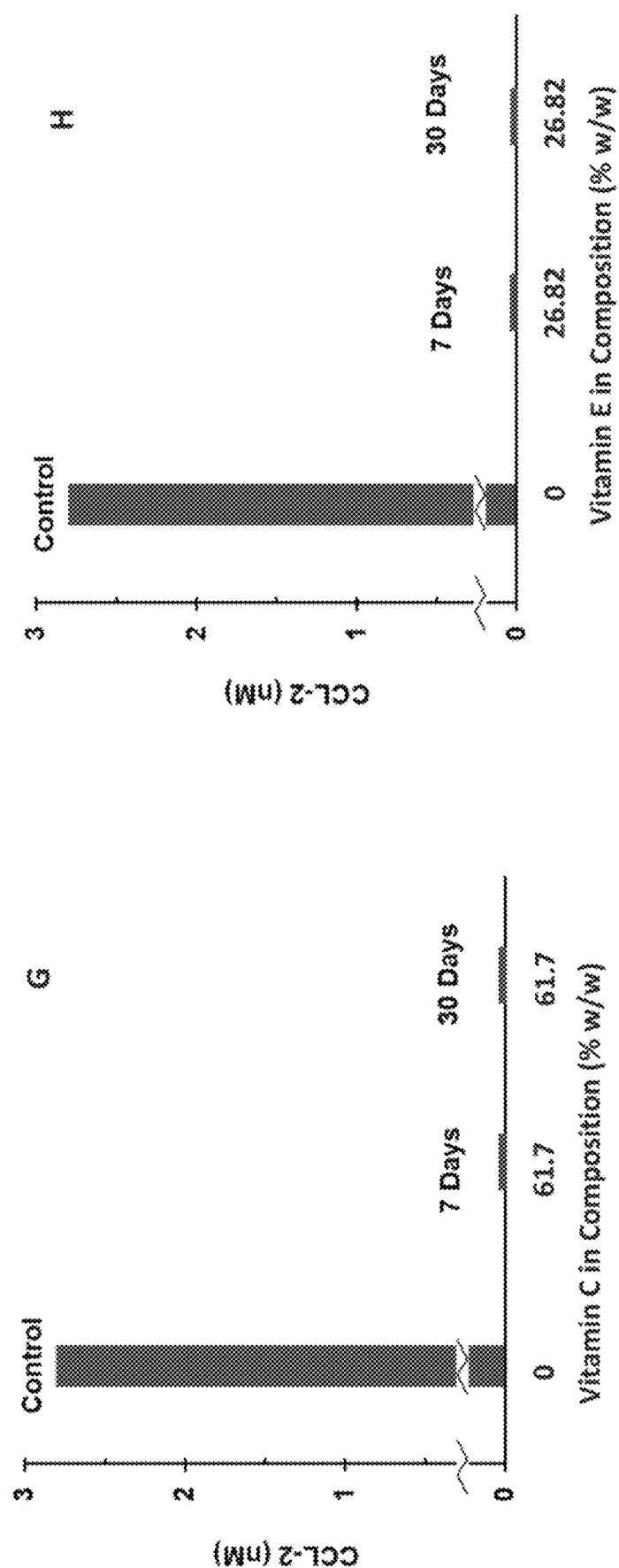

FIG. 2 was derived using CytoSolve® to model mechanisms of LGCI in adipocytes and pancreatic islet cells. The results in FIG. 2 represent the steady state concentrations of CCL2 for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the CCL2 levels are 2.8 nM, whereas for in individuals experiencing LGCI, the CCL2 levels fell to 0.015 nM, 1.12 nM, 0.015 nM, 1.19 nM, 0.98 nM, 0.015 nM, 0.0011 nM, and 0.012 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the CCL2 fell to $9.48 \times 10^{-7}$ nM. These results show that individually as well as in combination, epicatechin, EGCG, lycopene, quercetin, luteolin, vitamin A, vitamin C, and vitamin E, from Table 1 are able to reduce the CCL2 levels significantly.

Figure 3:
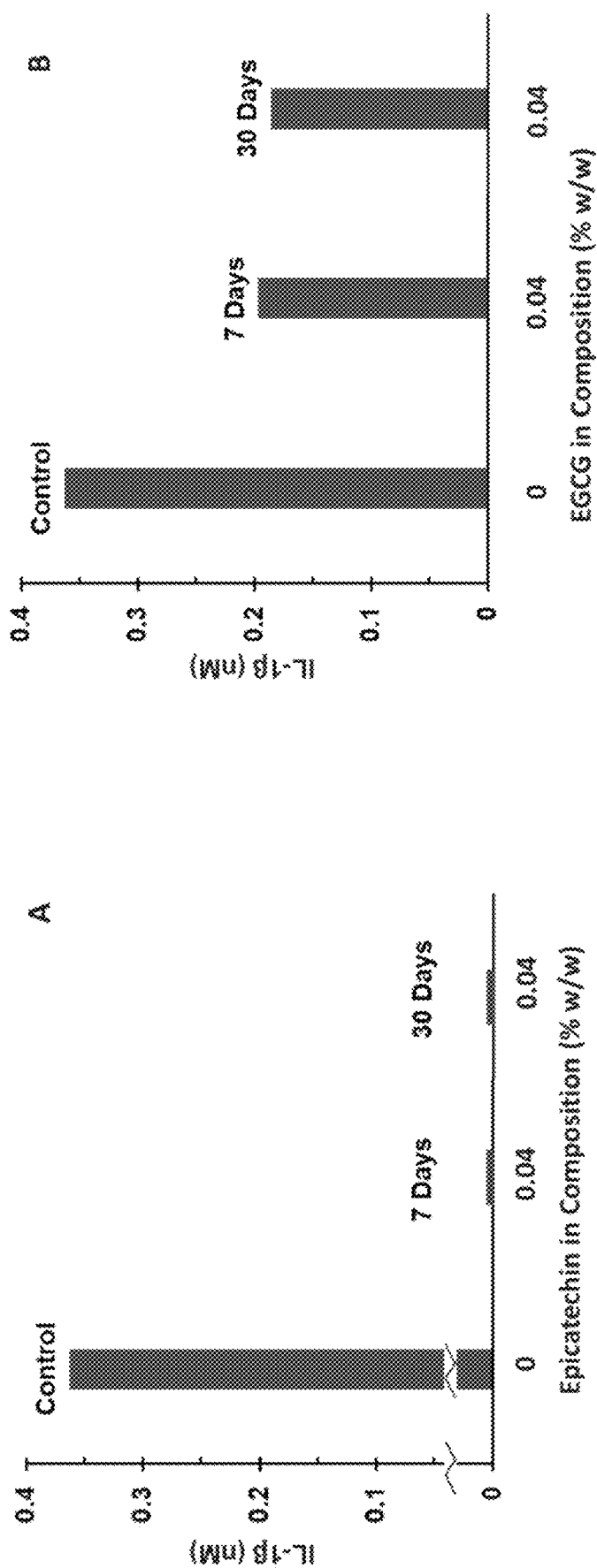
FIG. 3 shows bar graphs comparing the steady state concentrations of IL-1β for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the IL-1β levels are 0.36 nM, whereas for in individuals experiencing LGCI, the IL-1β levels fell to 0.002 nM, 0.18 nM, 0.002 nM, 0.17 nM, 0.26 nM, 0.002 nM, 0.009 nM, and 0.002 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the IL-1β fell to $3.5 \times 10^{-8}$ nM.
Figure 3:
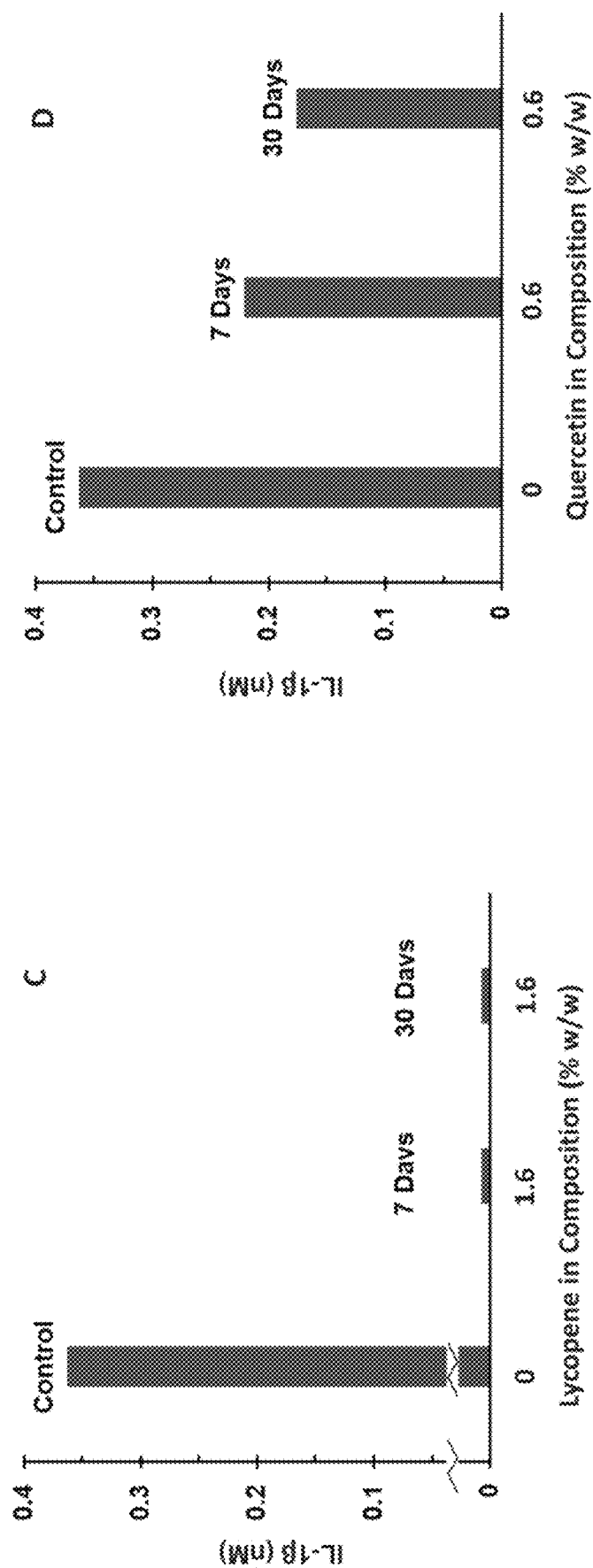
Figure 3:
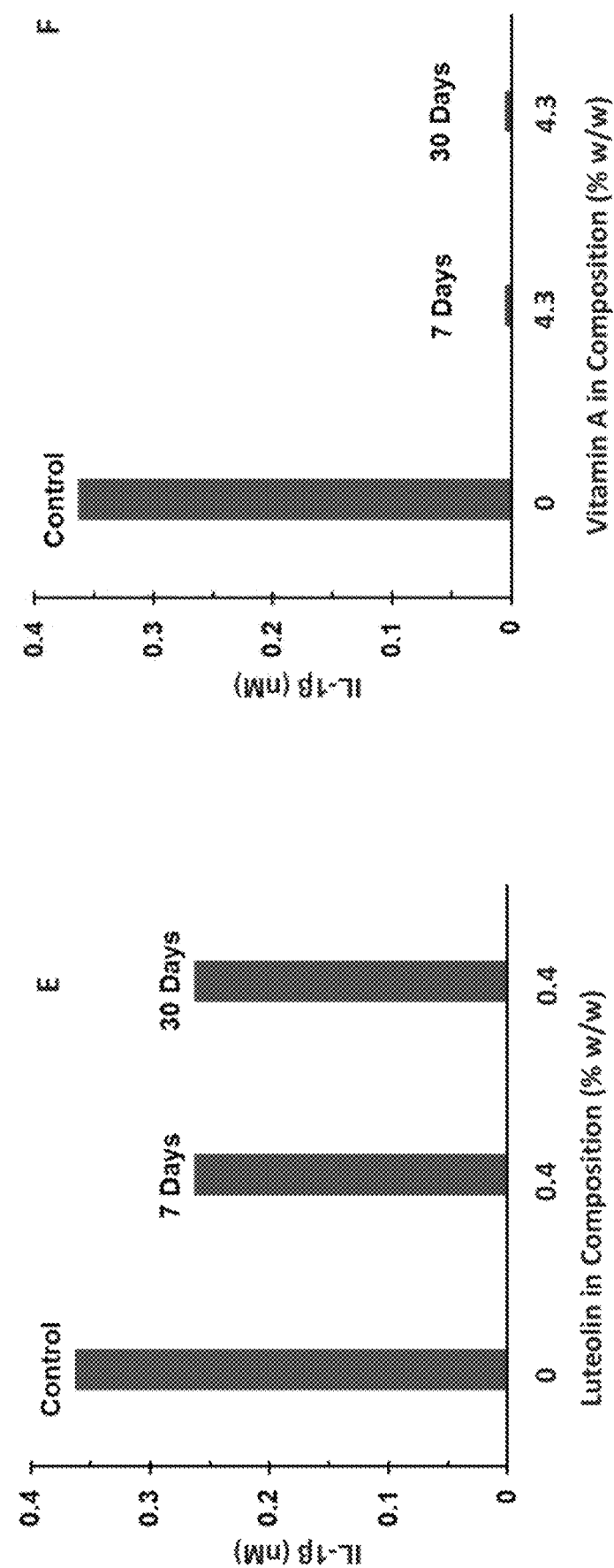
Figure 3:
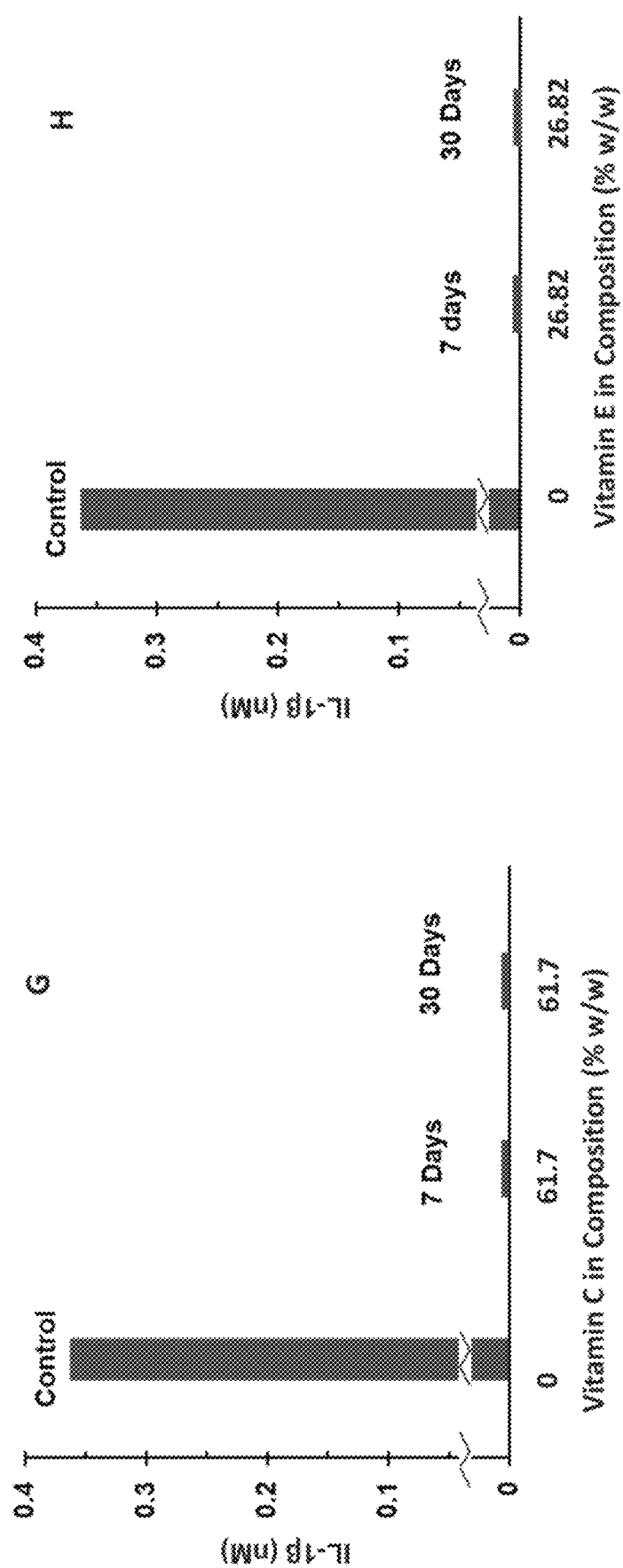

FIG. 3 was derived using CytoSolve® to model mechanisms of LGCI in adipocytes and pancreatic islet cells. The results in FIG. 1 represent the steady state concentrations of IL-1β for individuals experiencing LGCI without supplementation of composition described herein, with individuals experiencing LGCI with supplementation of only epicatechin in composition described herein (Panel A), only EGCG in composition described herein (Panel B), lycopene (Panel C), only quercetin in composition described herein (Panel D), only luteolin in composition described herein (Panel E), only vitamin A in composition described herein (Panel F), only vitamin C in composition described herein (Panel G), only vitamin E in composition described herein (Panel H), and the entire composition described herein (Panel I) over a period of seven (7) days and thirty (30) days. The plot is based on a biomolecular computational model using CytoSolve® and modeling mechanisms of LGCI. The results show that for individuals experiencing LGCI without supplementation of composition, the IL-1β levels are 0.36 nM, whereas for in individuals experiencing LGCI, the IL-1β levels fell to 0.002 nM, 0.18 nM, 0.002 nM, 0.17 nM, 0.26 nM, 0.002 nM, 0.009 nM, and 0.002 nM with supplementation of only epicatechin, only EGCG, only lycopene, only quercetin, only luteolin, only vitamin A, only vitamin C, only vitamin E, respectively. For in individuals experiencing LGCI with supplementation of the entire composition, the IL-1β fell to $3.5 \times 10^{-8}$ nM. These results show that individually as well as in combination, epicatechin, EGCG, lycopene, quercetin, luteolin, vitamin A, vitamin C, and vitamin E, from Table 1 are able to reduce the IL-1β levels significantly.

Example 2. In Vitro Efficacy Testing of Compositions for Reducing LGCI

The in vitro efficacy testing of compositions for reducing production of TNF-α, CCL2, and IL-1β to mitigate LGCI are being conducted using adipocyte culture model as described in Subash-Babu et al., 2022 (see, e.g., Subash-Babu et al. *Molecules* 23:4, which is incorporated by reference herein in its entirety). Experiments are being conducted with and without the application of the composition described herein. TNF-α, CCL2, and IL-1β concentrations will be measured in the cell culture as an indicator of LGCI. Samples from cell culture can be withdrawn and tested for TNF-α concentrations using absorbance spectroscopy ((see, for example, Hogan et al., *Current protocols in immunology*, J. Wiley & Sons, 1991, which is incorporated herein in its entirety), CCL2 concentrations using ELISA (see, for example, Ritter et al., 2017, *Arq Bras Cardiol.* 2017; 108(4):

331-338, which is incorporated herein in its entirety), and IL-1β concentrations using ELISA (see, for example, Yang and He, 2022, *BMC Complement Med Ther.* 2022 Mar. 3; 22(1):55, which is incorporated herein in its entirety).

Expected Results

Comparison of TNF-α, CCL2, and IL-1β concentration levels in the cell culture with and without application of composition described herein will be performed to determine the efficacy of the composition in lowering LGCI.

Example 3. Clinical Efficacy Testing of Composition on Reducing Oxidative Stress Protocol Clinical efficacy studies are being conducted for the composition described herein using up to 100 subjects over a period of four (4) week. The clinical study protocol is described below.

Study Group Selection
1. Inclusion Criteria
    a. Gender: Male and Female
    b. Non-smoking status
    c. Age: 18-55 years
    d. BMI: 24-40 kg/m$^2$
    e. Maintenance of normal exercise and activity patterns
    f. Total cholesterol ≤7.758 mmol/L (300 mg/dl)
    g. Triglyceride concentration ≤3.387 mmol/L (300 mg/dl)
2. Exclusion criteria:
    a. Individuals with chronic illness such as high blood pressure, diabetes
    b. Individuals receiving prescription medication
    c. Individuals taking antioxidant supplements Study Type Selection
    Placebo-controlled Randomized clinical study: Random allocation to either the group receiving the supplement under investigation or to a group receiving placebo treatment as the control Study Design Type
    Parallel-group: Each participant is randomly assigned to a group, and all the participants in the group receive (or do not receive) composition described herein.

Outcome Measurements
1. Will be based on plasma metabolites
2. Will include primary outcome and secondary outcome
3. Can be self-monitored questionnaire (or a smartphone app) or reported by people who know the individual participating in the study Results Results obtained from the clinical study will be analyzed to determine efficacy of composition described herein using the following steps:
1. Perform appropriate statistical tests to estimate the change levels in the 95% confidence interval for the two study groups where the outcome measure is in the form of ordinal level scale. Examples of such test include:
    a. Wilcoxson Rank-Sum test
    b. Mann-Whiney U test
2. Perform an intention-to-treat (ITT) analysis to overcome the issue arising from dropouts i.e. "Attrition bias."

OTHER EMBODIMENTS

It is to be understood that while the invention has been described in conjunction with the detailed description thereof, the foregoing description is intended to illustrate and not limit the scope of the invention which is defined by the scope of the appended claims. Other aspects, advantages, and modification are within the scope of the following claims.

What is claimed is:

1. A composition comprising:
    about 0.7% w/w of (−)-epicatechin;
    about 0.04% w/w of EGCG;
    about 1.6% w/w of lycopene;
    about 0.6% w/w of quercetin;
    about 0.04% w/w of luteolin;
    about 4.3% w/w of vitamin A;
    about 61% w/w of vitamin C; and,
    about 26.82% w/w of vitamin E.

2. The composition of claim 1, wherein the composition further comprises one or more excipients, diluents, or carriers.

3. A method for decreasing low grade inflammation in a subject comprising administering to the subject a composition of claim 1.

4. The method of claim 3, wherein the composition is administered orally.

* * * * *